(12) United States Patent
Thomas et al.

(10) Patent No.: US 6,317,745 B1
(45) Date of Patent: Nov. 13, 2001

(54) TRUSTED THIRD PARTY DATA STRUCTURE FOR ELECTRONIC FUNDS TRANSFER AND BILL PRESENTMENT

(75) Inventors: George F. Thomas, Oakdale; Albert G. Wood, Kings Park, both of NY (US); Joseph S. Pawelczyk, Morris Plains, NJ (US); Robert M. Cotton, New York, NY (US)

(73) Assignee: The Clearing House Service Company L.L.C., New York, NY (US)

( * ) Notice: Subject to any disclaimer, the term of this patent is extended or adjusted under 35 U.S.C. 154(b) by 0 days.

(21) Appl. No.: 09/526,430

(22) Filed: Mar. 15, 2000

Related U.S. Application Data

(62) Division of application No. 09/066,702, filed on Apr. 27, 1998.

(51) Int. Cl.⁷ .................................................. G06F 17/30
(52) U.S. Cl. ..................... 707/100; 707/104.1; 705/40; 705/45
(58) Field of Search ................................... 707/100, 104; 705/40, 45

(56) References Cited

U.S. PATENT DOCUMENTS

| | | |
|---|---|---|
| 4,491,725 | 1/1985 | Pritchard ................................. 705/2 |
| 4,823,264 | 4/1989 | Deming ................................. 705/39 |
| 5,095,480 | 3/1992 | Fenner ................................. 370/238 |
| 5,111,395 | 5/1992 | Smith et al. ........................... 705/45 |
| 5,220,501 * | 6/1993 | Lawlor et al. ......................... 705/42 |
| 5,283,829 | 2/1994 | Anderson ............................. 705/40 |

(List continued on next page.)

OTHER PUBLICATIONS

Nyach Systems And Operations Manual, Appendix B ACH Record formats, New York Clearing House, New York, NY.
Chips Systems And Operations Manual, X. Name And Address File Maintenance, pp. 1–207. New York Clearing House, New York, NY.
1998 ACH Rules, published by the National Automated Clearing House Association, Herndon VA. *Whole Document*.

*Primary Examiner*—Paul R. Lintz
(74) *Attorney, Agent, or Firm*—Fitzpatrick, Cella, Harper & Scinto

(57) ABSTRACT

A funds transfer system for facilitating electronic funds transfer between a payor and a payee by means of an intermediate trusted third party comprises: a payor station including a device for electronic communication of a payment order, the payment order comprising the payee's name, address and an amount owed by the payor to the payee; a home banking system including a computer structured to communicate electronically at least with the payor station, to receive the payment order, and with the trusted third party; a trusted third party system associated with the trusted third party, the trusted third party system comprising a computer structured to communicate electronically with both the home banking system and a bank of the payee. The home banking system computer is operable, upon receipt of the payment order from the payor station, to generate a universal identifier number uniquely identifying the payee and to transmit electronically the universal identifier number to the trusted third party via a communication with the trusted third party system. The trusted third party system computer also being operable, in response to receipt of the universal identifier number from the home banking system, to identify the payee as a party to receive payment, to generate a routing/transit number of the bank of the payee and the payee's account number from the universal identifier number, and to communicate electronically with the bank of the payee to facilitate transfer of the amount owed to the payee's account to the bank of the payee.

5 Claims, 16 Drawing Sheets

| National Mortgage Bank | 1 Main Street | Chicago | IL | 30251 | 1237 |
|---|---|---|---|---|---|

| Name | | | Address | | | City | | State | 5-Zip | 4-Zip |
|---|---|---|---|---|---|---|---|---|---|---|
| 60 | 50 | 1 | 0 | 0 | 0 | 65 | 40 | 2 | 0 | 16 | 0 | IL | 30251 | 1237 |

U.S. PATENT DOCUMENTS

| | | | |
|---|---|---|---|
| 5,326,959 | 7/1994 | Perazza | 235/379 |
| 5,383,113 | 1/1995 | Kight et al. | 705/40 |
| 5,453,601 | 9/1995 | Rosen | 705/65 |
| 5,455,407 | 10/1995 | Rosen | 235/380 |
| 5,465,206 | 11/1995 | Hilt et al. | 705/40 |
| 5,484,988 | 1/1996 | Hills et al. | 235/379 |
| 5,677,955 | 10/1997 | Doggett et al. | 705/76 |
| 5,699,528 | 12/1997 | Hogan | 705/40 |
| 5,793,869 | 8/1998 | Claflin, Jr. | 380/269 |
| 6,047,051 * | 4/2000 | Ginzboorg et al. | 379/130 |
| 6,202,054 * | 3/2001 | Lawlor et al. | 705/42 |

* cited by examiner

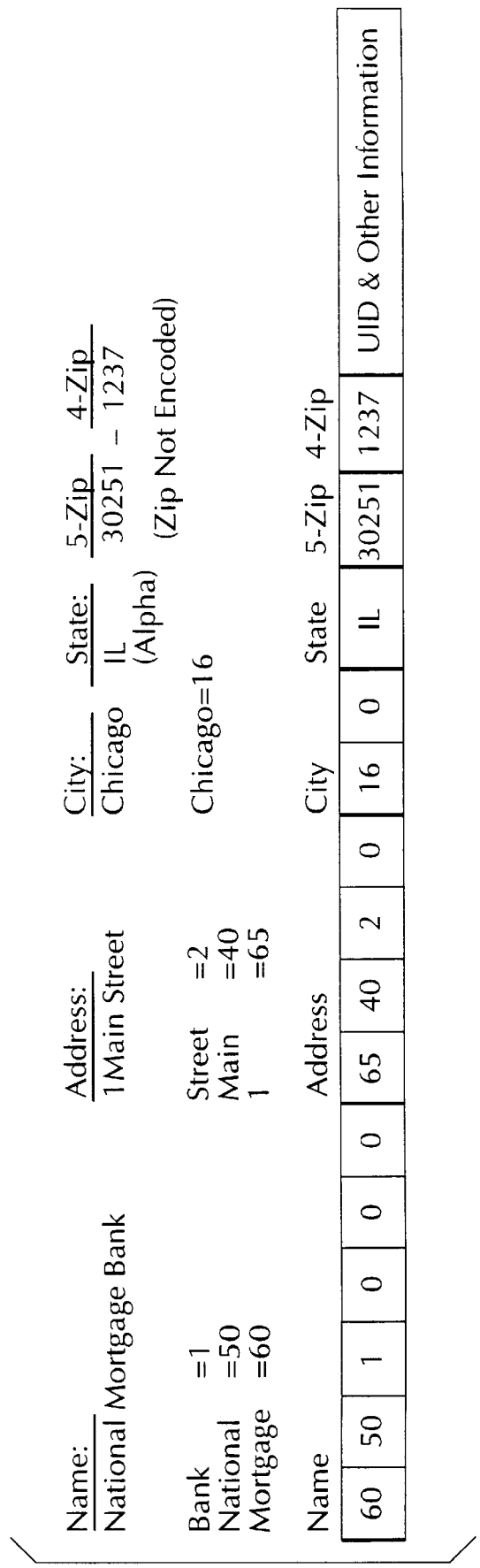

FIG. 6(a)

| National Mortgage Bank | 1 Main Street | Chicago | IL | 30251 | 1237 |

FIG. 6(b)

| Name | | | | | Address | | | | | City | State | 5-Zip | 4-Zip |
|---|---|---|---|---|---|---|---|---|---|---|---|---|---|
| 60 | 50 | 1 | 0 | 0 | 0 | 65 | 40 | 2 | 0 | 16 | 0 | IL | 30251 | 1237 |

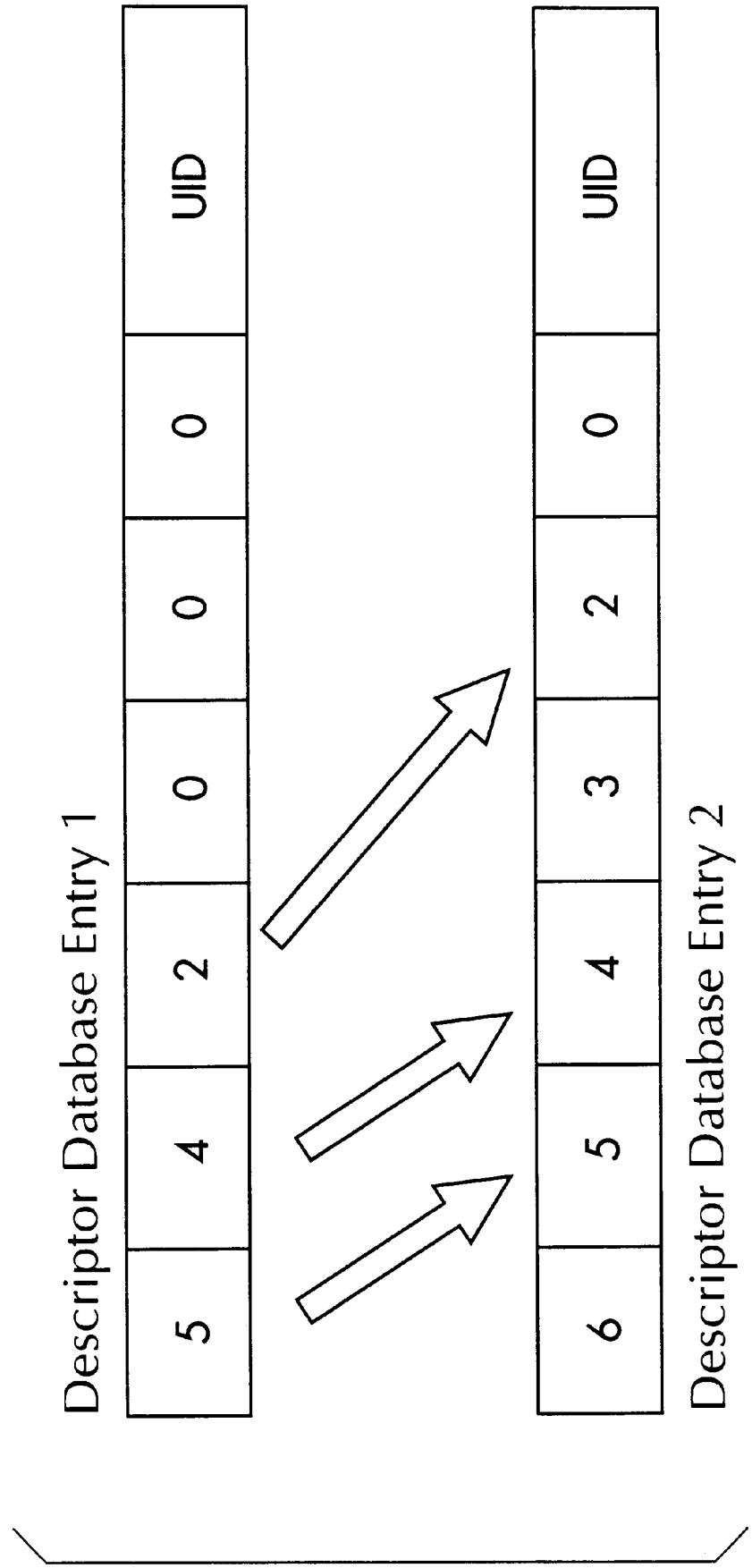

FIG. 8B

National Mortgage Bank

Bank = 1
National = 50
Mortgage = 60

| 60 | 50 | 1 | 0 | 0 | 0 | UID# |
|----|----|---|---|---|---|------|
| 50 | 1  | 0 | 0 | 0 | 0 | UID# |
| 1  | 0  | 0 | 0 | 0 | 0 | UID# |

TRUSTED THIRD PARTY DATA STRUCTURE FOR ELECTRONIC FUNDS TRANSFER AND BILL PRESENTMENT

This application is a division of application Ser. No. 09/066,702, filed Apr. 27, 1998.

BACKGROUND OF THE INVENTION

1. Field of the Invention

The present invention, according to a first aspect, relates to an electronic funds transfer method and system, and, according to a second aspect, an electronic bill presentment method and system.

2. Related Background Art

The current environment for payments involving business and banks is primarily a paper one. Businesses and banks have become masters of paper—business in handling payment remittances and banks in check processing. This efficiency in paper processing has created a weak or non-existent electronic bill payment infrastructure. The majority of businesses cannot post electronic payment information directly into their accounts receivable systems. The majority of banks do not have the ability to deliver remittance information to their business customers.

Banks are in a unique position at the center of the bill payment process. They hold the customer accounts from which payments are authorized and are uniquely positioned to deliver the remittance information to the biller. Banks are also positioned to deliver the invoice information to the billers' customers who are also the banks' customers.

Despite the widespread availability of ATMs and direct deposit of paychecks, most consumers have not embraced electronic payment systems. Discussion will follow of several prior art payment systems.

In conventional non-electronic bill payment systems, where an ongoing relationship exists, a party initiating payment (also referred to hereinafter as "payor" or "consumer") pays a debt to a biller by mailing a check in response to receipt of the biller's invoice. The term biller is used to refer to the payee or entity to be paid. Attached to most biller's invoices is a payment coupon to be returned with the check. The coupon contains at least the consumer-biller account number (C-B account number), as well as other information that will assist the biller, or the biller's bank, in properly crediting the consumer (i.e., the party initiating payment) with payment.

In recent years, with the common appearance of personal computers (PCs) in the home, electronic home banking has become increasingly popular. Electronic home banking systems permit consumers to automate the process of making payments to companies and individuals. Payment instructions are typically initiated by the consumer (party initiating payment) from the home PC terminal and forwarded electronically, generally over a telephone line, to the consumer's bank or other financial institution supporting home banking. In response to receipt of the payment instructions, payments are created by the bank or financial institution in a variety of methods. Payment instructions also have conventionally been transmitted via ATM or telephone touch tone keypad.

In one type of prior art electronic home banking system, illustrated in FIG. 1, the electronic payment instructions initiated by the consumer are converted by a bill pay service bureau, which may or may not be a bank, to a paper check, which is then mailed to the biller B, for eventual deposit into biller's bank account in bank B.

The electronic home banking system illustrated in FIG. 1 includes: consumer C 12, bank C 16, bank B 18, possibly a lockbox operator (not shown in FIG. 1), and biller B, who is typically not a willing participant in this system for reasons discussed further below. Additionally, a service bureau S 20 and a Bank S 22 are participants, with service bureau S maintaining a service database 24 that is used to match bill payment orders with billers.

In the bill pay system of FIG. 1, consumer C enrolls in the system by sending service bureau S an enrollment package comprising a voided check and list of billers to be paid by S on behalf of C. S subsequently sends biller B a biller confirmation to verify that C is actually a customer of B.

In the conventional, i.e., paper, bill payment method, the proper biller is identified by the remittance envelope and the payment coupon. However, neither of these are available to service bureau S in the system illustrated in FIG. 1. Thus, service bureau S must identify the correct biller for each bill payment order in some other manner. Typically, this is done by asking consumer C for biller B's name, address, telephone number and the C-B account number. Since it is possible that service bureau S does not have any account relationship with biller B, they must rely upon consumer C's accuracy in preparing enrollment package used to put biller B's information into service database 24. Service bureau S typically requires this information only once, during biller enrollment, storing it to service database 24 for use with subsequent payments directed to the same billers.

At some point after enrollment, consumer C receives a bill and initiates a bill payment order to S. The bill payment order includes authorization for service bureau S to withdraw funds from C's account in bank C to pay the bill, the amount to pay, the date on which to pay, and an indication of biller B as the payee. Service bureau S responds by confirming receipt of the bill pay order. Consumer C can send the bill pay order in any number of ways, such as using a personal computer and modem, directly or through a packet or other data network, via an automatic teller machine (ATM), video touch screen, a screen phone, or telephone Touch-Tone™ pad interacting with a voice response unit (VRU). However this is done, service bureau S receives one or more bill pay orders from consumer C. These orders could be instructions to pay some amount for a particular bill. or a set amount of money at periodic intervals.

Once service bureau S has confirmed that biller B is the biller that consumer C desired to pay with the bill pay order, service bureau S passes the funds to biller B after securing funds to cover the remittance. Bill payment can take several forms. A "check and list" is common in the art. A check and list comprises a single payment, a check drawn on service bureau S's account in bank S, accompanied by a list of all consumers whose individual remittances are aggregated in the single check. The list shows C-B account numbers and payment amounts for each consumer included on the list that should total to the amount of the single check.

The system of FIG. 1 has several drawbacks. For one thing, in response to an invoice mailed to the consumer, the biller expects to receive: (1) a check directly from the payor, along with (2) the payment coupon having encoded thereon, among other things, the C-B account number. Receipt of the check from the bill pay service S, rather than from the consumer, and without the coupon, must be treated by the biller as an exception item, which generates a great deal of additional expense for the biller.

Moreover, from the point of view of the consumer (payor), such a system implementation is inconvenient at least because of the time delays involved in preparing the check. The consumer might assume that, because the transfer was initiated electronically, the payment to tire biller was instantaneous, or at least performed more rapidly than if the consumer had mailed the check himself. In reliance upon this belief, the consumer might delay initiating a payment longer than he would if paying by his own check. Such a delay could result in late payments and customer relations headaches for the bill paying bureau.

Additionally, the system illustrated in FIG. 1 requires enrollment by the consumer in the system and requires that the consumer have a continuing relationship with the biller. Thus, this system is not useful for processing one-time, or infrequent, financial transactions.

Some of these problems could be solved by a system in which payment actually is made to the biller (payee) electronically, rather than by check. In one such system, described in U.S. Pat. No. 5,465,206, issued to Hilt et al., participating consumers pay bills to participating billers through a payment network. The participating consumers receive bills from participating billers (paper/mail bills, e-mail notices, implied bills for automatic debts) that indicate an amount owed, and a unique biller identification number (BRN).

In the Hilt et al. system, to authorize a remittance, the consumer transmits to its bank (also a participant in the system) a bill pay order indicating a payment date, a payment amount, the C-B account number, a source of funds and the BRN. The consumer's bank then submits a payment message to a payment network, and the payment network, which assigns the BRN's, forwards the payment message to the biller's bank. For settlement, the consumer's bank debits the consumer's account and is obligated to a net position with the payment network; likewise, the biller's bank receives a net position from the payment network and credits the biller's bank account. The biller's bank, upon receipt of the payment message, releases the funds to the biller, and provides Accounts Receivable (A/R) data to biller in a form that the biller has indicated, the form being one that does not have to be treated as an exception item to the biller, unlike in the system of FIG. 1. The biller's bank is assured of payment by the payment network, unless the transaction is a reversible transaction according to the preset rules of the payment network. In specific embodiments of the Hilt system, the consumer initiates the bill pay orders manually, via paper, at an AIM, via PC, or via telephone keypad.

However, because, in the Hilt system, the consumer initiating payment must know, among other things, a special identifier that uniquely identifies the biller, in this case the biller's BRN, this system is of limited usefulness for transactions between parties that do not have an ongoing relationship, where the consumer will likely only know the biller's name and address. In addition, the BRN's, which correspond to billers' account numbers, are disseminated to all payors, which may not be optimal for reasons of security.

Thus, the need exists for a system and method that would enable the payor to initiate an electronic payment without knowledge of a special identifier corresponding to the biller's bank and account number.

The need also exists for a system by which billers can present bills to payors electronically.

SUMMARY OF THE INVENTION

It is an object of the present invention to solve the aforementioned problems of prior art systems by providing a method by which the confidential information of a first party be uniquely identified based upon name and address information supplied by a second party without the need for the second party to have access to the confidential information.

It is another object of the present invention to solve the aforementioned problems of prior art systems by providing an electronic funds transfer method and system in which the biller's routing number and account number can be uniquely identified by the electronic home banking system based upon consumer supplied biller name and address information without the need for the consumer's bank to have access to the biller's bank account number and in which payment can be made electronically to the identified account.

It is a further object of the invention to provide an electronic home banking method and system that protects the security of bank customers and their bank's proprietary interests, without unnecessarily distributing information regarding bank affiliation or account number.

It is a further object of the invention to provide a method and system of electronic bill presentment that permits billers to present bills to payors at the payors home banking systems without the need for the biller to have access to information regarding the payor's bank.

To further these objects, a funds transfer system for facilitating electronic funds transfer between a payor and a payee by means of an intermediate trusted third party is provided. The funds transfer system comprises: a payor station including a device for electronic communication of a payment order, said payment order comprising the payee's name, address and an amount owed by the payor to the payee; a home banking system including a computer structured to communicate electronically with the payor station, to receive the payment order, and with the trusted third party; a trusted third party system associated with the trusted third party, the trusted third party system comprising a computer structured to communicate electronically with both the home banking system and a bank of the payee. The home banking system computer is operable, upon receipt of the payment order from the payor station, to generate a universal identifier number uniquely identifying the payee and to transmit electronically the universal identifier number to the trusted third party via a communication with the trusted third party system. The trusted third party system computer is operable, in response to receipt of the universal identifier number from the home banking system, to identify the payee as a party to receive payment, to generate a routing/transit number of the bank of the payee and the payee's account number from the universal identifier number, and to communicate electronically with the bank of the payee to facilitate transfer of the amount owed to the payee's account to the bank of the payee. Preferably, the home banking system computer has stored therein a database, supplied by the trusted third party, including name and address information of the payee and the universal identifier number, and not including corresponding routing/transit and account number information of the payee.

To further these objects, a method of electronic funds transfer between a payor and a payee by an intermediate trusted third party is provided. The method comprises the steps of: upon receipt by the trusted third party of a universal identifier number uniquely identifying the payee and generated, in response to a payment order from the payor, by a home banking system of the payor from information stored on a database resident at the home banking system, generating, at the trusted third party, from the received universal identifier number a routing/transit number of the payee's bank and the payee's account number to identify the payee as a party to receive payment, the routing/transit number of the payee's bank and the payee's account number being known only to the trusted third party; and communicating, by the trusted third party, with payee's bank to facilitate transfer of an amount owed by the payor to the payee to the payee's account in the payee's bank. The method preferably further comprises the steps of generating the database at the trusted third party, the database including name and address information of the payee and the universal identifier number uniquely identifying the payee, and not including corresponding routing/transit and account number information of the payee, and distributing, before the routing/transit number generating step, the database to the home banking system.

To further the above objects, there also is provided a funds transfer system for facilitating electronic funds transfer between a home banking system of a payor and an account of a payee. The system comprises: a trusted third party structured to communicate with both the home banking system and a bank of the payee maintaining payee's account, means associated with the home banking system for transmitting a universal identifier number to the trusted third party in response to receipt by the home banking system of a payment order from the payor, the universal identifier number uniquely identifying the payee; means associated with the trusted third party operable in response to receipt of the universal identifier number from the home banking system to identify the payee as a party to receive payment, and for converting the universal identifier number so as to identify the routing/transit number of the payee's bank and the payee's account number; and means associated with said trusted third party for communicating with payee's bank to facilitate payment in accordance with payor's payment order to payee's account.

To further the above objects of the present invention, there also is provided a method for electronic bill presentment between a biller and a payor by a trusted third party intermediary. The method comprises: generating, by the trusted third party, a database including name and address information of the payee and a universal identifier number uniquely identifying the payee, and distributing the database to a home banking system of the payor; receiving, at the trusted third party, a biller order from the biller, the biller order comprising the payor's name, address and an amount to be paid by the payor to the biller; upon receipt by the trusted third party of the biller order, generating, at the trusted third party, a bill routing message and transmitting the bill routing message to the payor's home banking system, the message including the universal identifier number corresponding to the payor; and upon receipt by the home banking system of the bill routing message from the trusted third party, routing, by the home banking system, a bill to the payor corresponding to the bill routing message. The trusted third party preferably routes the bill to the payor using an ACH message formed based upon routing information resident in a master database resident at the trusted third party.

To further the above objects of the present invention, there also is provided a method of electronic funds transfer between a payor and a payee by an intermediate trusted third party, the trusted third party having previously distributed to a home banking system of the payor a database including universal identifier numbers uniquely identifying accounts including that of the payee. The method includes the steps of: receiving, at the home banking system, a payment order from the payor; upon receipt by the home banking system of the payment order, identifying, at the home banking system, the universal identifier number uniquely identifying payee's account from information stored in the database; and transmitting, by the home banking system, the universal identifier number identified in the identifying step, to the trusted third party to facilitate payment to payee's account.

To further the above objects of the present invention, there also is provided a computer-readable medium for storing data for access by an application program being executed on a data processing system resident at a trusted third party that has been supplied with confidential information of customers of at least one participating institution. The medium comprises: a data structure stored in the computer-readable medium, the data structure including information resident in a database used by the application program and comprising: a plurality of descriptors, each descriptor including a set of indicia identifying name, address, and the confidential information for one of the customers of the at least one participating institution, and a universal identifier uniquely identifying the one customer. Preferably, the confidential information comprises routing/transit number and account number information associated with each customer.

To further the above objects of the present invention, there also is provided a method of transferring funds from a home banking system of a payor to an account of a payee. The method comprises the steps of: upon receipt by the home banking system of a payment order from the payor that includes character information, encoding the received character information by assigning a numerical value to identified nonblank character strings present in the received character information; forming a descriptor of indicia identifying the payee using the encoded numerical information; comparing the formed descriptor with database descriptors stored in a database supplied by a trusted third party until a match is found; and transmitting a universal identifier, associated in the database with the matching database descriptor and uniquely identifying the payee, to the trusted third party to facilitate payment to payee's account.

To further the above objects of the present invention, there also is provided a web-based bill presentment method for presenting bills by a biller to a payor using a trusted third party having a resident database including an e-mail address of the payor, the payor being a customer of a bank that has a bill presentment server. The method comprises: receiving, at the trusted third party, a bill presentment order from the biller; and in response to an inquiry from the bill presentment server of payor's bank, transmitting billing information of the biller to the payor's bank, which in turn, by means of the bill presentment server, presents the bill for display to the payor using the e-mail address of the payor. Preferably, display means linked to the bill payment server is made available to the payor, and the payor indicates a willingness to pay the bill by clicking a payment icon displayed by the display means and associated with the bill.

To further the above objects of the invention, there also is provided a method of correlating between at least two entities by an intermediate trusted third party. The method comprises the steps of: receiving, by the trusted third party, a universal identifier number uniquely identifying a first one of the at least two entities and generated in response to a inquiry from a second one of the at least two entities from information stored on a database; and generating, at the trusted third party, from the received universal identifier number confidential information relating to the first one of the at least two entities to identify the first one, the confidential information being known only to the trusted third party.

The method preferably further comprises the steps of: generating the database at the trusted third party, the database including name and address information of the first one of the at least two entities and the universal identifier number uniquely identifying the first one, and not including corresponding confidential information of the first one, and distributing, before the confidential information generating step, the database so as to facilitate access to the database by the second one of the at least two entities.

Further objects, features and advantages of the present invention will become apparent from the following description of the preferred embodiments with reference to the attached drawings.

BRIEF DESCRIPTION OF THE DRAWINGS

FIG. 5 illustrates the format of the database descriptor;

FIGS. 6(a) and 6(b) illustrate the format of a database payee record;

FIGS. 8A and 8B show an example of descriptor inclusion and shifting of over-descriptors, respectively;

DETAILED DESCRIPTION OF THE PREFERRED EMBODIMENTS

I. Electronic Funds Transfer

Figure 1:
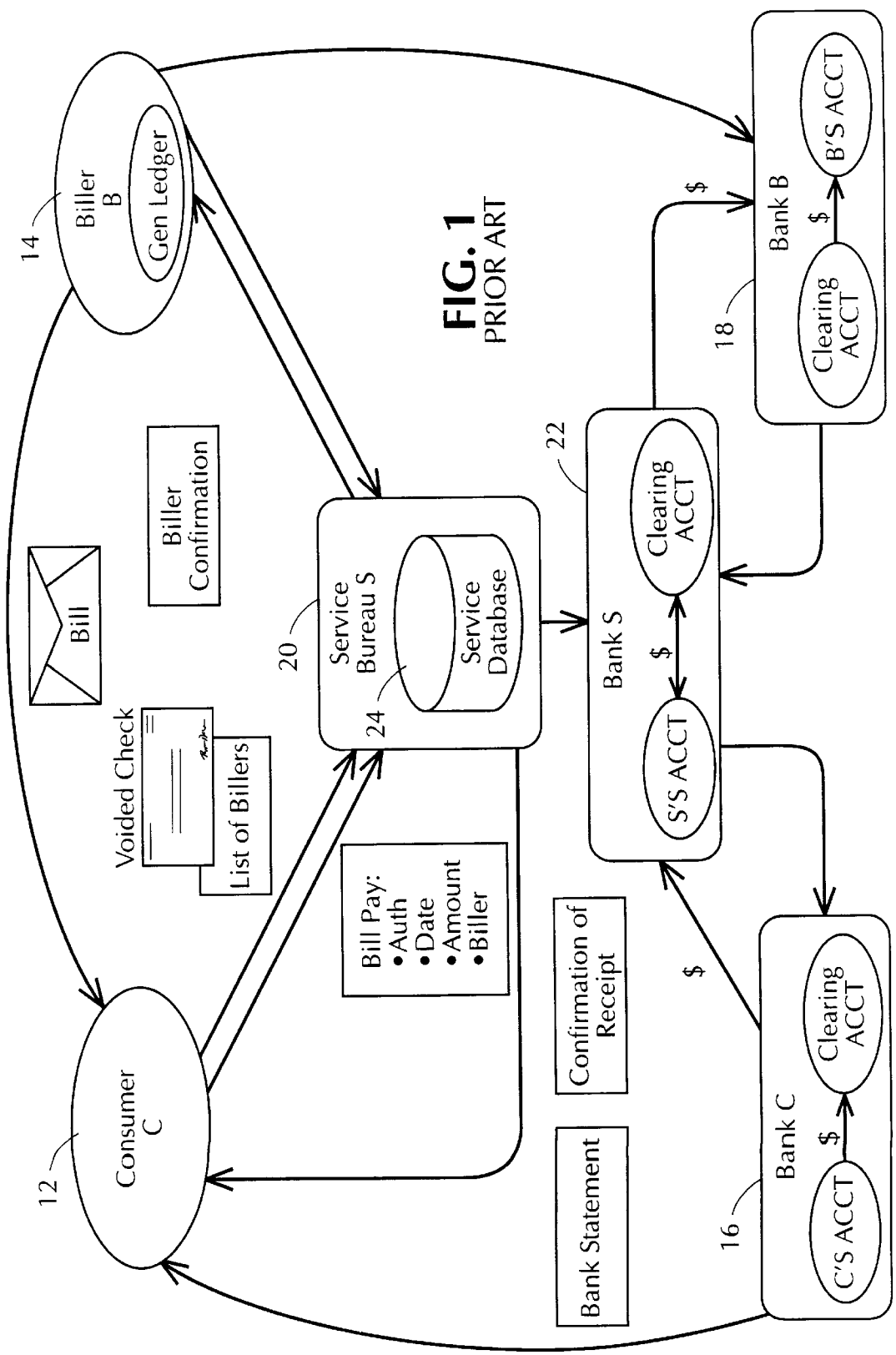
FIG. 1 is a block diagram of a conventional electronic bill paying system utilizing a bill pay service bureau.

The electronic funds transfer method and system according to the present invention will now be described in accordance with a preferred embodiment. Although the system is described herein as it relates to home banking, it can be used by any party wishing to initiate payments electronically, preferably through the Automated Clearing House (ACH) network, for example by means of the New York Automated Clearing House, which is trusted to have access to account information for all customers of its member banks. Moreover, the method is not limited to a method of transferring funds but may be utilized for any application that requires a correlation between two entities in which confidential information is to be made known only to a trusted third party intermediary.

The ACH network is a low-cost electronic payment mechanism that can be used efficiently to pay both individual consumers and companies, regardless of size. The system is flexible and highly reliable and incorporates the use of national standards. In order to use the ACH network, bank routing information and the payee (demand deposit account (DDA) identifier) account number must be supplied. This information must either be supplied by the initiator of the payment, or must be retained by the banking system of the payor ("home banking system"). This presents a major problem that inhibits widespread use of the ACH since bank routing and account information of the payee is rarely conveyed to payors for use in initiating payment instructions since this information is not generally disseminated. Banks also are often reluctant to share this information with unrelated third parties, including other banks. At best, therefore, most payors only know the payee's name and address, and, in certain situations, such as where an ongoing relationship exists, the C-B account number.

The present invention solves this problem by making use of the facilities of a trusted third party (TTP) intermediary, preferably an automated clearing house, such as the NYACH, to gain easy access to the ACH network by home banking systems, while maintaining transparency to the end user.

To achieve this goal, a database of, among other things, payee name, address, routing number, DDA account number, and preferably taxpayer ID information, is developed that enables home banking systems, previously provided with information from the database that does not include the routing number and DDA account numbers, to generate ACH messages uniquely identifying the biller to the TTP and that can be translated by the TTP to bank routing and account information, thus facilitating use of the ACH to effect payments without unnecessarily distributing the routing number and account number information.

The technology used to develop the system is adapted from the Clearing House Interbank Payments System (CHIPS) Universal Identifier (UID) database system. CHIPS, established in 1970, processes international and domestic payments electronically and is the foremost means of transferring U.S. dollars among world banks. In the CHIPS a universal identifier number is utilized that uniquely identifies individual customer accounts. The CHIPS UID number is a six-digit number that is used to identify named accounts at depository institutions on the CHIPS system, uniformly across the system, since CHIPS' inception in 1970.

In the present invention, a universal identifier (UID) number, not necessarily or preferably corresponding to the CHIPS format, is assigned to correspond to each biller. The TTP, and only the TTP, can correlate the biller's UID with the biller's routing number and account number. However, as will be described in detail below, since a database containing the biller names and addresses, and associated UID's, has been distributed to the home banking systems, the home banking systems, using software supplied by the trusted third party, can produce a UID when supplied by a party initiating payment with the biller's name and address. A home banking system of the party initiating payment can then create ACH payment messages, for example, in customer initiated entry (CIE) format, for consumer to business transactions, and in PPD format, for business to consumer transactions, from payor-initiated instructions without having access to biller bank routing and account number data, and forward these to the TTP, trusted by all participants to hold onto this data, whose computer system will interpret the received message to determine the bank routing and account number of the biller to whom payment is to be sent. Message formats for ACH transactions are set forth in "1998 ACH Rules", available from the Nation Automated Clearing House Association, 607 Herndon Parkway, Suite 200, Herndon, Va. 20170, starting at page OR 28.

A CIE entry is defined as a credit entry initiated by or on behalf of the holder of a consumer account to affect a transfer of funds to the deposit account of the Receiver. "CIE+" is a CIE entry with one addenda record. A PPD entry is defined as a credit or debit entry (other than MTE or POS entry) initiated by an organization pursuant to a standing or single entry authorization from a Receiver to effect a transfer of funds to or from a consumer account of the Receiver. "PPD+" is a PPD entry with one addenda record.

An ACH message normally includes, among other things, an account number field and a routing number field. To implement the present invention, a UID number, previously assigned by the TTP and uniquely identifying the biller, is placed by the home banking system in the account number field of an ACH message and a special identifier flag, e.g., all 9's, is placed in the routing number field to identify the message as one requiring special treatment. The TTP recognizes the special identifier flag is present in the routing number field, indicating to the TTP receiving the ACH message that special treatment of the message is necessary. The trusted third party then performs a lookup of the actual routing number and account number at a central database using the supplied ACH UID, substitutes the stored routing and account numbers that correspond to the UID into the ACH message for the special identifier and received UID, respectively, and, once the substitution has been made, completes processing of the payment through the ACH network in the same manner as any other ACH transaction. The result is an electronic payment received in a timely and accurate fashion at reduced cost to the originating financial institution. Advantageously, in the present invention the payor's home banking system knows the UID, but does not know the biller's account/routing number, increasing the confidentiality of the system.

Figure 2A:
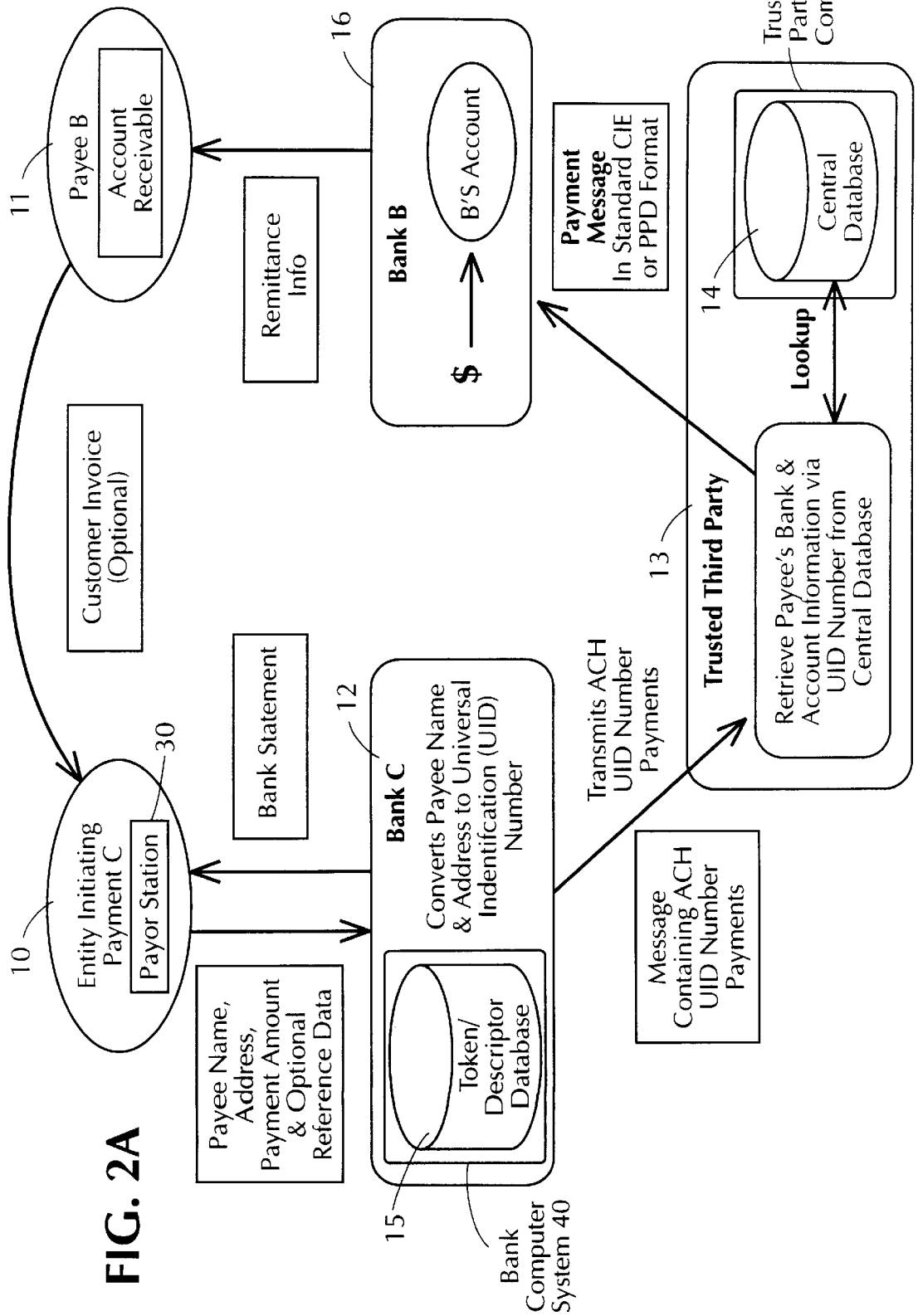
FIG. 2A is a block diagram of the electronic banking system according to the present invention.

A preferred embodiment of the system for implementing the present invention will now be discussed with reference to FIG. 2A. As shown in FIG. 2A, the system components include the entity initiating payment 10 (the "consumer" or "payor"), the consumer's bank C 12 (payor's home banking system), trusted third party (TTP) 13, payee's Bank B 16, and payee B 11. The entity initiating payment 10, is equipped with a payor station 30, preferably consisting of a personal computer and modem for electronically communicating over a phone line, although the payor station may comprise an ATM or a telephone touch-tone key pad, or other similar device.

Figure 2B:
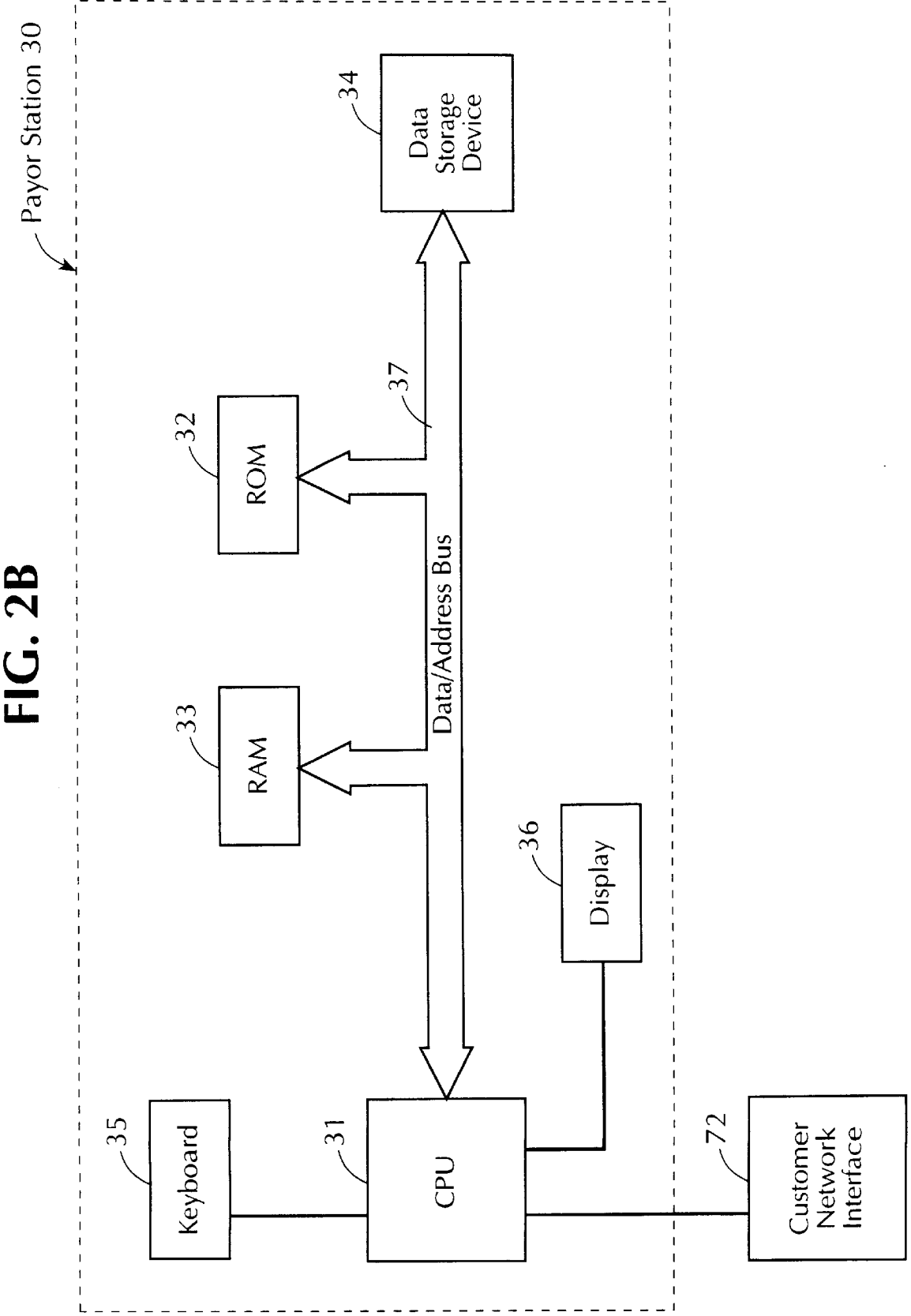
FIG. 2B is a block diagram of the structure of the payor station according to the present invention.

FIG. 2B illustrates the components of the payor station 30 in block diagram form. The payor station 30 includes a CPU 31 that performs processing functions. The payor station 30 also includes a read only memory 32 (ROM), which stores at least some of the program instructions to be executed by CPU 31, such as portions of the operating system or basic input-output system (BIOS), and a random access memory 33 (RAM) used for temporary (e.g. scratchpad) storage of data.

The payor station 30 also includes customer network interface 72 which enables the payor station 30 to communicate with external devices. In particular, the data network interface 72 enables communication between the payor station 30 and bank C (which constitutes the payor's home banking system), more specifically bank computer system 40. The interface preferably comprises a modem and a dedicated telephone line. However, other network interfaces, such as an ISDN terminal to interface with an ISDN network, or an Internet interface, may be used as well.

A data storage device 34 is provided to allow for storage of data. Data storage device 34 may be written to or read from by the CPU 31. Data/Address bus 37 connects the ROM 32, RAM 33 and data storage device 34 to the CPU. A keyboard 35 is provided to receive input from the payor 10. Input from the payor 10 may be provided instead by a mouse (not shown), or by any conventional method of operator input. A display 36 is provided for conveying information to the operator of the payor station 30.

To initiate payment of an outstanding debt to payee B 11 in this embodiment, payor 10 sends, by means of payor station 30's network interface, a payment order to bank C 12, which is received by bank computer system 40. The payment order preferably includes payee name and address information, the amount to be paid, and optional reference data identifying the payor. In a case where an ongoing relationship exists between the payor and the payee, the payor's account number can be used to identify the payor. Where no such ongoing relationship exists, the payor's name may be employed as the optional reference data.

Figure 2C:
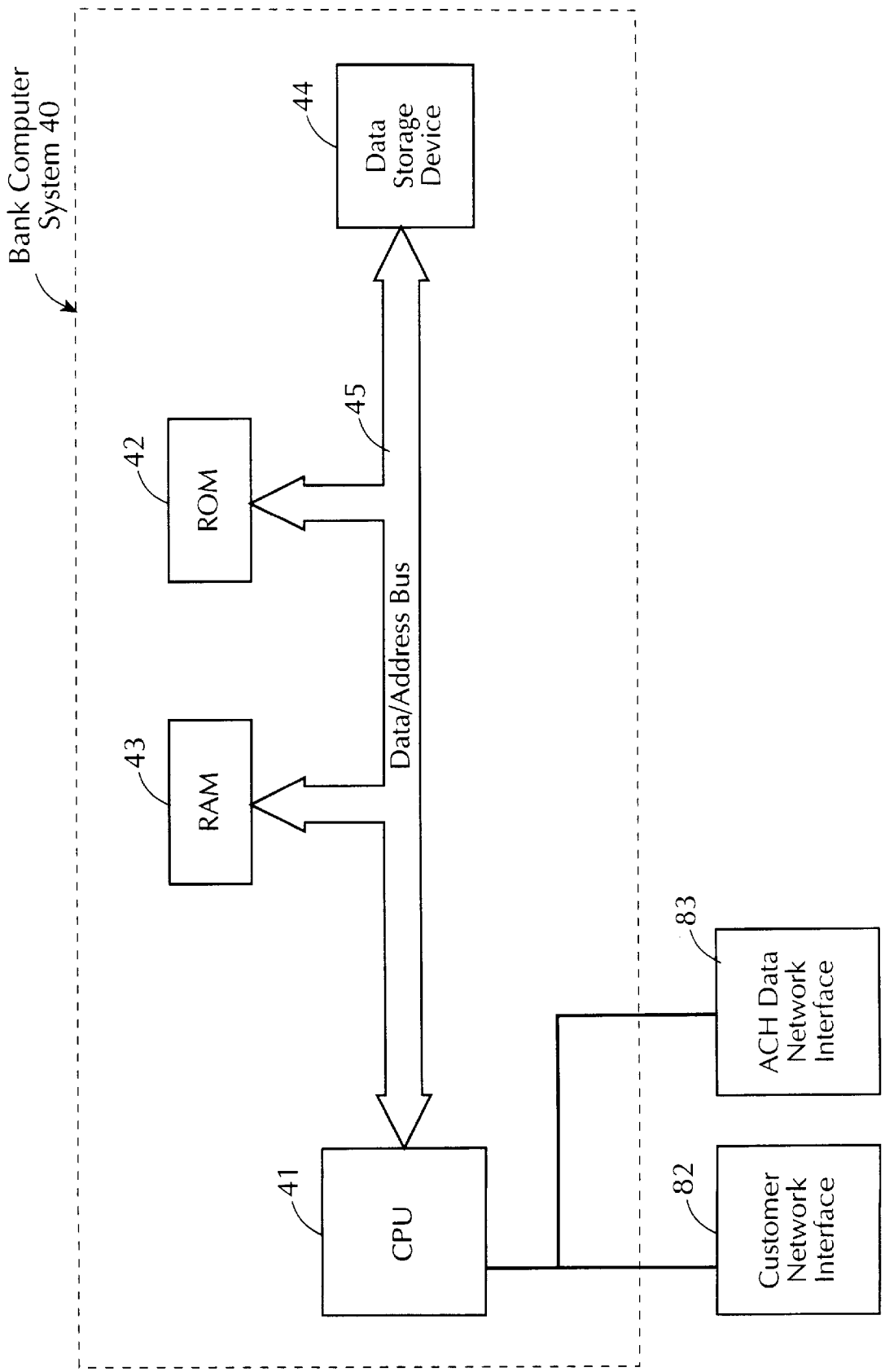
FIG. 2C is a block diagram of the structure of the computer system resident at payor's bank.

Bank C 12 is equipped with a computer system 40, which is illustrated, in block diagram form, by FIG. 2C. As shown in FIG. 2C, bank computer system 40 preferably includes a CPU 41, ROM 42 and RAM 43. Bank computer system 40 also includes a customer network interface 82, to enable electronic communication with the payor station 30 over a phone line, ISDN network, or via the Internet, and an ACH data network interface 83, to enable communication over the ACH network, in particular with the trusted third party computer system 50 resident at the trusted third party 13. Bank computer system 40 includes a data storage device 44 on which is stored a token/descriptor database 15 that has previously been supplied by the TTP. Data/address bus 45 connects the ROM 42, RAM 43 and data storage device 44 to the CPU 41.

Figure 2D:
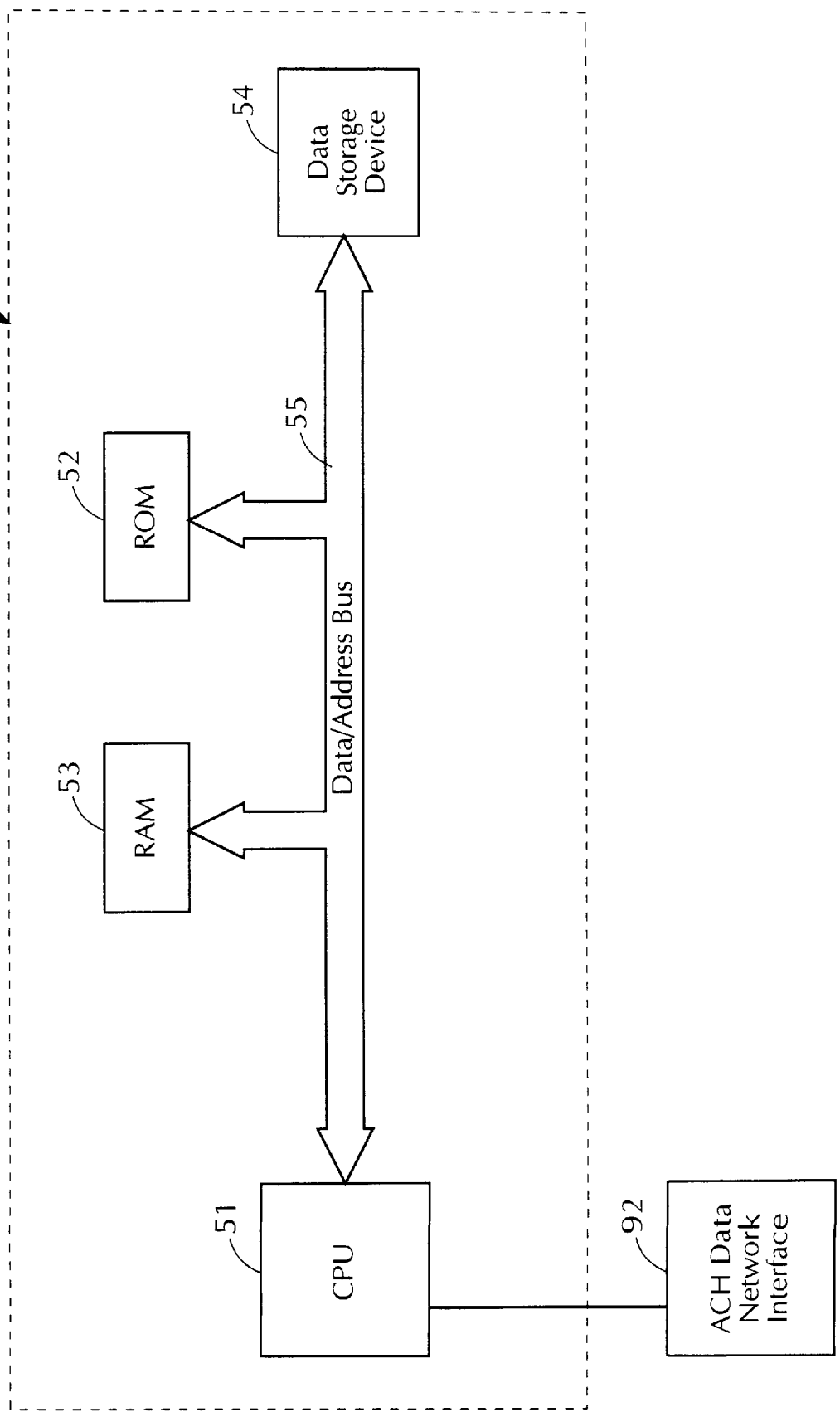
FIG. 2D is a block diagram of the structure of the computer system resident at the trusted third party.

FIG. 2D illustrates the trusted third party computer system 50, resident at the trusted third party 13. The trusted third party computer system includes a CPU 51, a ROM 52, a RAM 53 and a data storage device 54. Data/address bus 55 connects the ROM 52, RAM 53 and the data storage device 54 to the CPU 51. An ACH data network interface is provided which enables communication over the ACH system, in particular with the bank C 12 and biller's bank B 16, as well as any institution on the ACH network.

Although the connections between the bank C computer system and the TTP, as well as the connection between the TTP and biller's bank B are illustrated in FIG. 2A as direct connections, in actual practice, electronic communication between these parties may utilize intermediate ACH operators between the parties to facilitate the communication. Any reference to electronic communication between the parties is intended also to cover communication through such intermediaries.

Token/descriptor database 15, resident in the data storage device 44 of bank C's computer system 40, includes descriptors with encoded keys corresponding to the name and address tokens of each of the billers supplied by participating banks. Software, also supplied by the TTP, resident on bank C's computer system 40 associates the name and address transmitted by the payor with the account of a particular biller. This is achieved by first forming a descriptor data structure corresponding to the information input by the payor and then finding a match from among the descriptors stored in the resident token/descriptor database that has been previously supplied by the TTP. The database descriptors stored in the token/descriptor database each have appended thereto, or associated therewith, among other information, a universal identifier number (UID), previously generated by the TTP, that uniquely identifies the payee so that when a match is found between the descriptor generated in response to the input name and address and one of the descriptors stored in the token/descriptor database, the UID for the payee is identified. Each participant in the instant electronic funds transfer system, such as bank C, is supplied with the token/descriptor database to allow payments to be made by and to customers of the respective banks.

Figure 3:
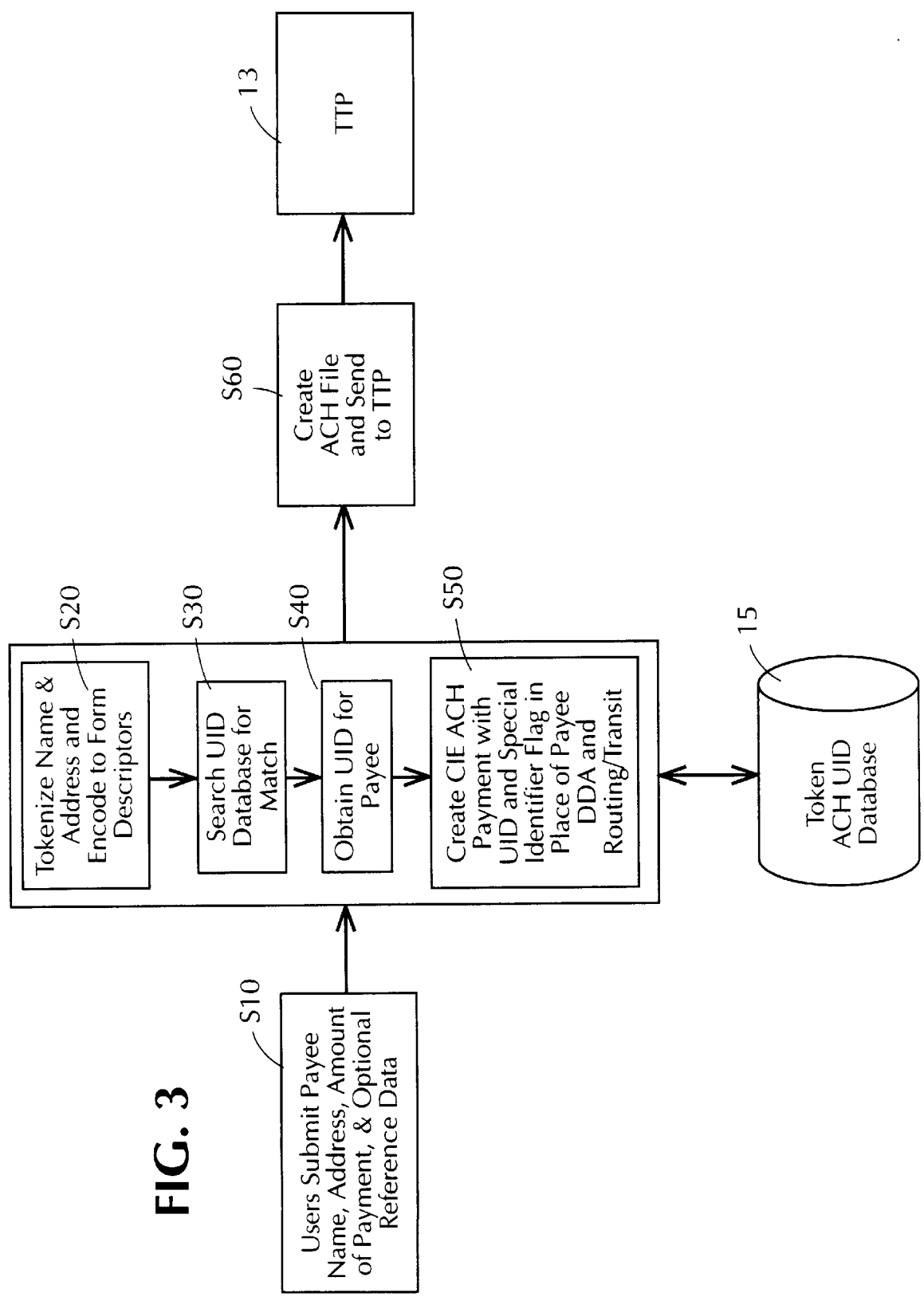
FIG. 3 is a diagram illustrating the operation of the payor's home banking system in an embodiment of the present invention.
Figure 4:
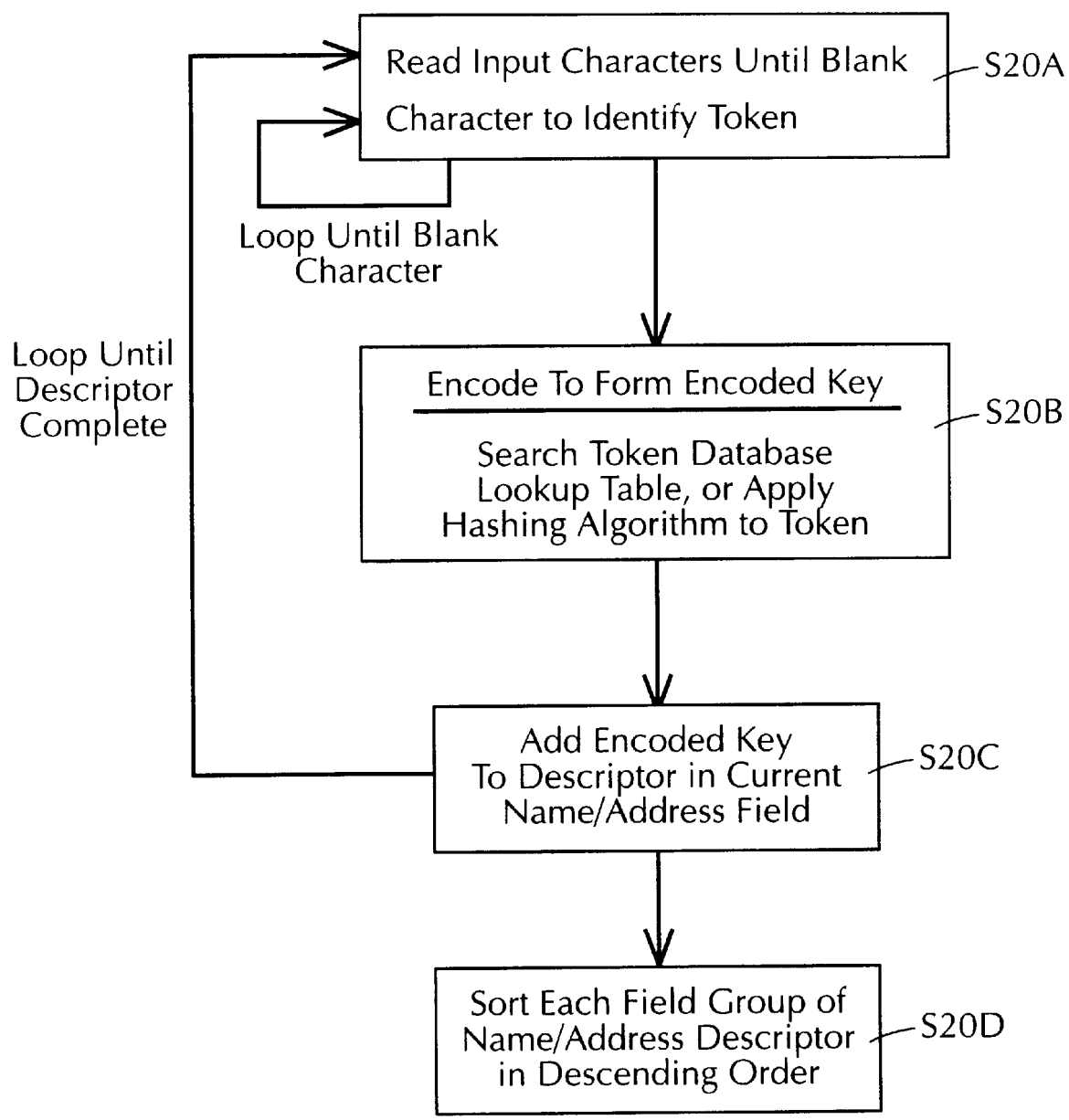
FIG. 4 illustrates the operation of the token encoding process that takes place at the payor's home banking system.

The software supplied to bank C by the TTP and resident in bank C's computer system 40 identifies the corresponding UID by means of a process illustrated in FIG. 3. As shown in that figure, after the payor has transmitted the name and address information of the biller (preferably together with the amount to be paid and the optional reference data) at S10, the name and address are tokenized, that is, broken down into constituent non-blank character strings (tokens) and encoded at S20. This is done by the process shown in FIG. 4. As shown in FIG. 4, the text input by the payor (which constitutes a payment field) is scanned at S20A until a blank character is located. The non-blank character string preceding the blank forms the first token. The process is repeated until all the input text has been tokenized.

Once the input characters have been tokenized, the tokens for the name, address and city entries are encoded at S20B to form encoded keys. Encoding of the tokens involves assignment to each token a corresponding number, or encoded key, as it will be referred to hereinafter. Once the tokens have been encoded, the encoded keys are placed in the various fields of the descriptor array (name and address and city) at S20C, the encoded keys resident in each descriptor field group are then sorted at S20D, by any conventional sorting method, so that the highest values of the encoded keys, corresponding to the rarest words, are placed first within that group. State information is not encoded but is stored as alphanumeric information corresponding to the two-letter designation for the state used by the U.S. Postal Service. Five-digit and four-digit zip codes are also not encoded but simply stored in respective fields as numerical entries.

For encoding, it is preferable that most commonly used words have associated keys available in a lookup table. Such a lookup table contains a list of tokens, and in a second field, a number associated with each token. Encoding is the most processor-intensive part of the name identification system. The inventors have achieved satisfactory performance from an encoding procedure based on a binary search preceded by table lookup of the first two characters of the token.

Preferably, text input by the payor is subjected to preprocessing before encoding. Such preprocessing includes: (a) replacing special characters with space or null; (b) closing up (eliminating) null characters; (c) combining adjacent isolated single characters into a single token (e.g., I B M becomes IBM); (d) reducing multiple spaces to a single space; and (e) changing all letters to uppercase.

Comparing encoded descriptors instead of using text comparison advantageously reduces descriptor size, since certain words, such as "noise" words (i.e., words that do not assist in identifying a name), are never placed in the descriptor, and simplifies code, at least because number-encoded values can be stored in fields of fixed size, permitting more efficient machine code for the matching process.

Due to practical limitations on the size of the token list (lookup table), for certain rare words, it may be more efficient to perform encoding by means of a hashing function that will, for any token, always assign it the same number (i.e., key). Such a function would be used both at the trusted third party for generating the token data base in the first place, a process described further below, and at the bank C for encoding the name and address information input by the consumer. All tokens encoded by the hashing technique will be considered rare and will have encoded values larger than the values assigned to tokens in the token lookup table.

The process for matching the generated descriptor with the corresponding stored descriptor at payor's home banking system will now be described. As illustrated in FIG. 3, once the input name and address data has been tokenized and encoded, the generated payment party descriptor must be compared at S30 to the resident database 15 containing descriptor records of all participating payees to determine if there is a match. It is very important at the payor's home banking system (bank C) to avoid a false positive match between the descriptor generated from the data input by the consumer and the descriptors resident in the token/descriptor database, since such a match would result in payment being made where one was not intended. Accordingly, the preferred method of matching at the bank C is exact matching. In this method, for each field, a predetermined first number of the encoded keys are compared and must match exactly for a match to be declared for a given field.

The descriptor format includes at least the following fields, some of which may be empty:

(1) Name of the individual or business
(2) Several address lines
(3) City
(4) State
(5) Five-digit zipcode
(6) Four-digit zipcode extension FIG. 5 is a simplified representation of a database descriptor. Each such descriptor is generated at the TTP, in a manner to be discussed in further detail below, and supplied to each participant, such as bank C, as part of the token/descriptor database. FIG. 5, illustrates how the name, address and city information is encoded, that is, assigned encoded keys. In the example shown in the figure, the payee is National Mortgage Bank. For the name field, the word "Bank" is assigned the number 1, the word "National" is assigned 50, and "Mortgage" is assigned 60. The least commonly used words are assigned the highest numbers and placed first in the descriptor array, as shown in the figure. The same process is performed for the address, and city fields. Each descriptor also includes appended thereto the UID corresponding to the biller, as well as other information.

In response to the input of name and address information by the payor, a payee name and address descriptor is generated by the bank C. A simplified representation of a payee name and address descriptor is shown in FIGS. 6(*a*) and 6(*b*) for the same payee as the one represented by the database descriptor shown in FIG. 5.

FIG. 6(*a*) shows the characters input by the consumer in the various fields of the descriptor. FIG. 6(*b*) shows the descriptor generated by the encoding and sorting programs resident on the bank's computer system. As can be seen from FIGS. 5 and 6(*a*)–(*b*), descriptors corresponding to the biller should be identical in each name and address field, that is, should exhibit an exact match.

Returning to the flowchart of FIG. 3, if a match is found during the comparison between the generated descriptor and one of the database descriptors, that is, if a database descriptor exists that exactly matches the generated payment party descriptor, the UID associated with the database entry is returned at S40 and is placed into an ACH record. These records are incorporated into a file of ACH transactions that is then transmitted to the trusted third party for further processing at S50 and S60. If a match cannot be found, existing procedures for generating payments would be followed (not shown).

Two name descriptors are considered to match if an initial minimum number of keys are equal. (The minimum number may be set to the maximum if it is desired to force exact matching.)

Note that since the keys that are required to match are those at the left ends of the two key groups, those keys are also the rarest keys in the groups, since encoded token numbers occur in decreasing order within a descriptor. Therefore, tokens with the highest encoded token numbers, which are the least common and most significant, occur first.

Similarly, two address descriptors are considered to match if an initial minimum number of keys are equal. The same is true with the city descriptors. The inventors have achieved good results with a minimum number of three was chosen for the name and the address descriptors, and one as the minimum for the city descriptor.

In a variation of the preferred method, the principle of inclusion might be used also in authorizing payments. In such a variation, a payee name and address would be required to include a database descriptor in order to effect a match. Database descriptors would be structured to include the minimum number of essential tokens from each name and address field. In this variation, additional checking would be needed to guard against payee descriptors with excessively many additional keys, or with rare additional keys. The weakest feasible additional check would be to require that the payee descriptor may include, as a set, at most one database descriptor.

Name and Address Fields

The trusted third party maintains the database containing records for customers of the participating financial institutions, the billers in the system of the present invention. These records include the following fields, some of which may be optional:
(1) Name of the individual or business
(2) Several address lines
(3) City
(4) State
(5) Five-digit zipcode
(6) four-digit zipcode extension
(7) Identifier of the financial institution
(8) Biller's account number
(9) Universal Identification Number (UID), assigned by the trusted third party
(10) E-mail address
(11) Taxpayer ID.

Note that items (7), (8) and (11) are not distributed to participating banks as part of the token/descriptor database, and item (10) will only be distributed with proper authorization.

The following record layout for a bank customer field is a layout that may be used to model some of the techniques described here. Customer Free Format is a number 1 or 2 indicating whether the next five fields will be treated as a free-form name group or as the five distinct fields shown.

| | |
|---|---|
| CUSTOMER FREE FORMAT | PIC 9(01) |
| CUSTOMER LAST NAME | PIC X(30) |
| CUSTOMER FIRST NAME | PIC X(12) |
| CUSTOMER MIDDLE NAME | PIC X(12) |
| CUSTOMER NAME PREFIX | PIC X(08) |
| CUSTOMER NAME SUFFIX | PIC X(08) |
| CUSTOMER ADDRESS 1 | PIC X(31) |
| CUSTOMER ADDRESS 2 | PIC X(31) |
| CUSTOMER ADDRESS 3 | PIC X(31) |
| CUSTOMER CITY | PIC X(20) |
| CUSTOMER STATE | PIC X(02) |
| CUSTOMER ZIP5 | PIC 9(05) |
| CUSTOMER ZIP4 | PIC 9(04) |
| CUSTOMER ACCOUNT NUM | PIC 9(18) |
| CUSTOMER DFI IDENTIFIER | PIC 9(09) |
| CUSTOMER UID | PIC 9(10) |
| CUSTOMER E-MAIL | PIC X(34) |
| CUSTOMER TAXPAYER ID | PIC 9(16) |

A layout for the generated descriptor file follows. The PIC X(03) key fields are treated as 24-bit binary numbers to provide a large number of possible values.

| | |
|---|---|
| DESCRIPTOR ADDRESS KEY | PIC X(03) OCCURS 8 |
| DESCRIPTOR CITY KEY | PIC X(03) OCCURS 2 |
| DESCRIPTOR STATE | PIC X(02) |
| DESCRIPTOR ZIP5 | PIC 9(05) |
| DESCRIPTOR ZIP4 | PIC 9(04) |
| DESCRIPTOR ACCOUNT NUM | PIC 9(18) |
| DESCRIPTOR DFI IDENTIFIER | PIC 9(09) |
| DESCRIPTOR UID | PIC 9(10) |
| DESCRIPTOR E-MAIL | PIC X(34) |
| DESCRIPTOR TAXPAYER ID | PIC 9(16) |

The notations on the right are in COBOL syntax. The numbers within parentheses show field size. These sizes are illustrative only. Fields with a 9( ) specification are numeric, while those with an X( ) specification are alphanumeric. "OCCURS" shows that the field is repeated some number of times.

The DESCRIPTOR NAME KEY items are encoded keys formed from a CUSTOMER name, using the fields from CUSTOMER LAST NAME through CUSTOMER NAME SUFFIX. DESCRIPTOR ADDRESS KEY items are encoded keys formed from CUSTOMER ADDRESS lines 1 through 3. DESCRIPTOR CITY KEY items are encoded keys formed from the CUSTOMER CITY field. The remaining descriptor items are identical to the corresponding items in the CUSTOMER record.

These layouts are merely an example of the type of record layouts that may be used.

Finally, in any of the variations above, the definition of match may be relaxed so that two name and address descriptors are regarded as matching if the name descriptors match and one of the following three cases holds:

(1) Address, city and state match; or
(2) Address and zip5 match; or
(3) Zip 5 and zip4 match.

This criterion is illustrative only. The bank could alter the exact rules that it chooses to use. There is no need for all participating banks to adopt precisely the same criterion for a match. Only those procedures of the banks affecting the operations at the trusted third party need to be standardized; any materials furnished by the trusted third party to the banks to help them to implement the system would also be uniform.

In the normal course of events, once the payor's entered name and address have been tokenized, encoded, and a match found in bank C's descriptor database, UID payments from bank C are transmitted to the trusted third party as part of files of other ACH transactions already originated by participating financial institutions. As was discussed above, the ACH message format is altered in the present invention to substitute the UID in place of the account number. A special identifier flag, for example all 9's, is substituted for the routing number. After a UID is received by the TTP from the payor's home banking system and recognized as such by the presence of the special identifier, it is used by the TTP, and particularly by the trusted third party computer system 50, to retrieve from the TTP's central database 14 the payee's bank routing and account number. Once this information has been ascertained, the routing and account numbers are substituted for the special identifier and UID, respectively, and the message is transmitted to payee's bank B 16, crediting payee's bank account for the amount to be paid by the entity initiating payment.

The retrieval involves a lookup, performed by the trusted third party computer system 50 in the central database 14, and substitution in the ACH message of the UID supplied by bank C with the payee's account number and the special identifier with the routing/transit number of the payee's bank B. After the substitution is made, the transaction takes the same route as any other ACH transaction in the ACH network.

Because the trusted third party previously has been supplied with all the payee account numbers, neither the payor nor bank C need know payee's bank account number or the bank the payee uses.

Database Maintenance at Trusted Third Party

For the present invention to work properly, bank customers must be able to be reliably identified by their name and address information. To make the system work at a suitably high confidence level, database maintenance carried out at the trusted third party is utilized to ensure that the confusion of one name and address with another will rarely occur.

As was discussed above, the database is updated periodically as needed to make sure the customer name and address information is kept up to date, as well as to take into account additional participating banks. However, checking for name similarity at database update time cannot, by itself, ensure that such confusion does not occur. The maintenance program can only compare names and addresses that already have been entered into the system; it cannot know whether customers of banks not yet in the system may have name and address fields similar to some currently on file. However, if an effort is made to bring as many banks system during a given time period, then the likelihood of errors from this source will be minimized. Use of taxpayer ID would also prevent such errors.

Maintenance Design Goals

The maintenance goals given below reflect a concern for potential problems that might become important when the database becomes very large, with perhaps tens or hundreds of millions of entries. The design goals include:

(A) Every Name/Address (N/A) must be associated with exactly one UID. Personal or business N/A's with several accounts would have a UID associated only with one account, usually the first one entered into the system. UID's could be associated with each of several accounts for the same legal entity, as specified by rules that may be adopted, provided that means are supplied to distinguish the N/A fields in some way, for example by the addition of box or department numbers.

(B) Pursuant to (A), the system must establish with confidence that any two N/A's in the database are in reality different. This will be referred to as the identity problem. Again, use of taxpayer ID would resolve the identity problem.

(C) The subset/superset problem: This is the problem of determining whether, given any two corresponding fields of two N/A records, the set of tokens in the field of the first record is a subset of the set of tokens in the corresponding field of the second. In such a case, the first record will be called a subset of the second. The records of such a pair may easily be confused, since merely omitting one or more keys from one N/A could produce the other. If the two records have the same zipcode, then the situation must be reported to the financial institutions involved in a warning report. It may also be desirable to postpone assigning a UID to a new entry that has this relationship with an existing record. If the zipcodes are different, the two entries could be flagged so that home banking customers (i.e., payors) would be required to supply a zipcode with either of these two N/A fields. The warning to the financial institution might be omitted in this case.

(D) The phonetic misspelling problem: This is the problem of determining whether two distinct N/A entries in the database have descriptors consisting of the same phonetically encoded keys. One such phonetic encoding technique is Soundex. Then one N/A entry could be transformed into the other by misspelling one or more words in a phonetically plausible manner. Actions to be taken in such cases might be the same as in (C) above; or as determined by the governing body.

Note that (C) and (D) could occur together. That is, two N/A entries might fall into case C if certain words in the entries were plausibly phonetically misspelled. By using the methods to be described, both C and D as well as their combined manifestations can be detected.

Figure 7:
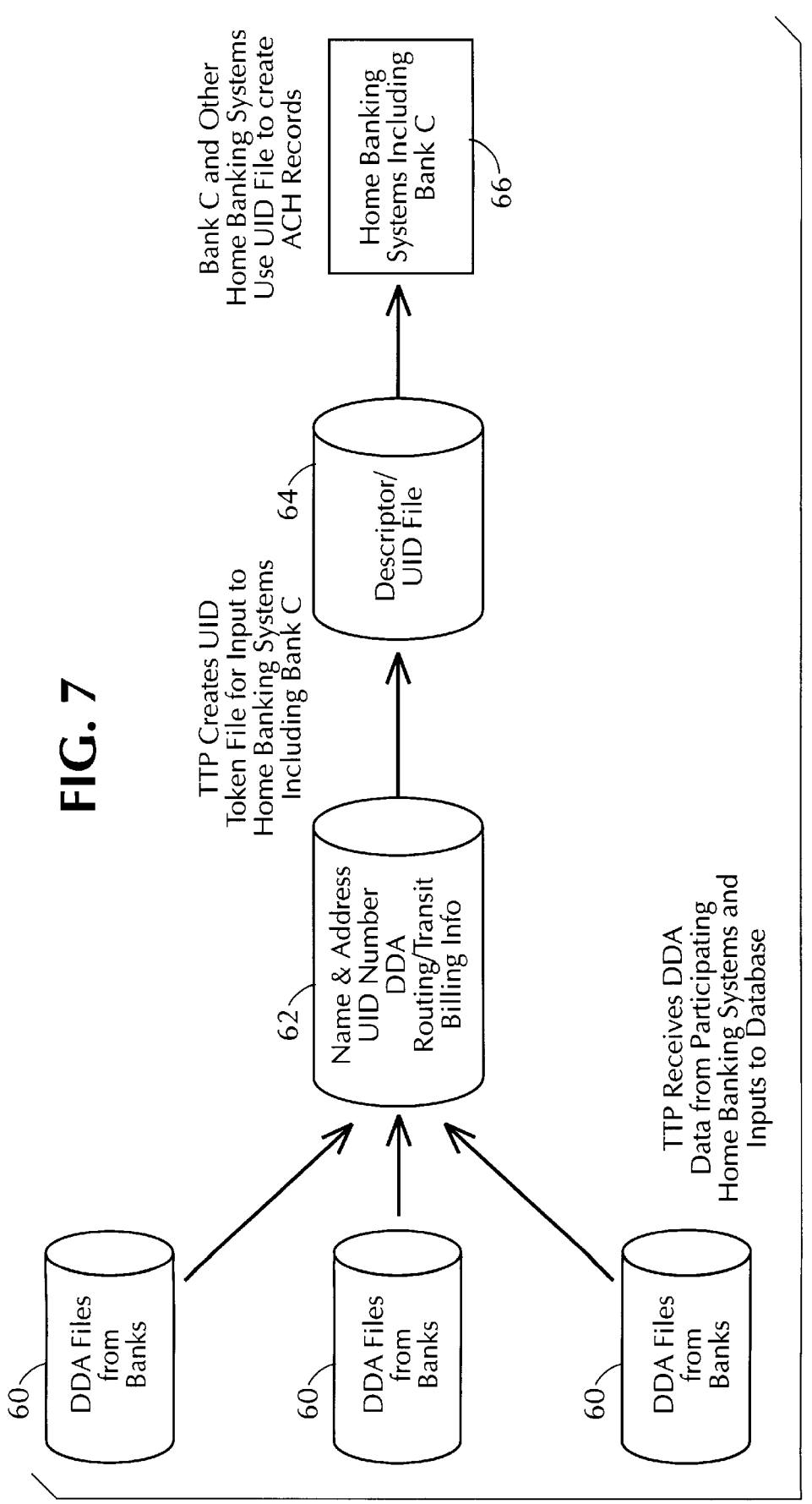
FIG. 7 is a diagram illustrating the flow of information into and out of the trusted third party.

The flow of information to be distributed among the participants that is required to implement the electronic funds transfer method and system of the present invention is shown at FIG. 7.

As shown in FIG. 7, trusted third party 13 is first supplied with customer account information from (DDA files from Banks 60) participating banks and other financial institutions. The central database 14 is generated, from the supplied information, and is resident in a computer system (not shown) at trusted third party 13.

The central database 14 stores, among other information, name and address information, taxpayer ID if available, bank routing/transit numbers and DDA accounts for all bank customers who are potential receivers of ACH payments. This information is illustrated at reference numeral 62. Participating banks supply this information to the trusted third party for inclusion in the database. Potential receivers of the ACH payments can be any customer of any participant.

Upon receipt by the trusted third party 13, the customer records are added to the central database 14. The name and address information supplied by participating banks forms a Customer Name and Address file at the TTP. This file is used by the TTP to create the descriptor database. A token list is formed from the name and address list. The list is in table form and includes a second column given the encoded value to be assigned to each token during encoding. This list is used at the TTP to encode each name and address and to form an associated descriptor. The collection of descriptors, with UID's assigned by the TTP appended thereto, represented by reference numeral 64, is sent to banks 66, such as bank C, together with the token list (lookup table) to enable bank C to encode tokens corresponding to consumer-entered names and addresses and to compare the generated descriptor with those stored in the database of descriptors supplied by the TTP.

A key advantage of the present invention is that the routing numbers and account numbers are supplied by the participating banks to the TTP but are not transferred to the various home banking systems, such as bank C. Note that bank C may function both as a participating bank and the home banking system.

The trusted third party database is periodically revised to include updates received from participating financial institutions. Home banking systems also preferably periodically receive updates to their token/descriptor database.

As discussed above, the test for a match at home banking systems, such as bank C, must be extremely strict, to avoid false matches. However, in reviewing the descriptor database of all customers, the TTP may utilize certain techniques which require less stringent matching criteria.

One such technique is descriptor inclusion. Descriptor inclusion may be utilized at the TTP to help ensure against the possibility that one name and address might be confused with another. Such confusion may occur if one set of keys includes another, so that merely omitting keys from one descriptor could produce the other.

If taxpayer ID is not available, then in generating the database 14 at the TTP, it is important that an inclusion check be made to see if matches exist between descriptors generated from different name and address information. For example, if one bank customer is "National Mortgage Bank", while another customer is "National Bank of Mortgage", because of the fact that the encoded keys for "National", "Bank" and "Mortgage" are present in the descriptors that would be generated from each name, it is possible that a false match could be declared at the bank. In order to prevent this occurrence, it is advisable that when the database is generated at the TTP, an inclusion check is performed to determine whether such a situation exists. In order to keep the system free of such events, certain maintenance steps should be performed at the TTP.

FIG. 8A illustrates inclusion between name fields of two descriptors. As shown in the figure, each encoded key in the top descriptor field is included in the bottom descriptor field, which could lead to confusion if keys are left out for the customer represented by the bottom descriptor.

At the TTP, in order to check for the occurrence of inclusion in the descriptor database, the entire file of descriptors is sorted. To test for inclusion, the first descriptor is compared with, that is, an inclusion check, to be described below, is performed with each descriptor having the same first entry. Since, as in FIG. 8A, inclusion may exist even where first entries do not match, shifting of the first group in each descriptor is performed, as shown in FIG. 8B, so that each entry is placed first in one shifted version of the descriptor. All of the shifted descriptors are included in the sorted file of descriptors when the inclusion check is performed.

Shifted Descriptors

To carry out a matching of a database descriptor file with itself to check for descriptor inclusion in batch mode, the file of including descriptors (overfile) is augmented to contain multiple descriptors for each of its N/A descriptors. The additional descriptors are produced by shifting the name group within the original descriptor left, one place at a time, dropping the most significant encoded key at each step. The file of descriptors not so augmented is referred to in the following discussion as the "underfile". The test for inclusion determines which descriptors, if any, in the underfile exhibit inclusion with respect to the overfile.

In batch matching, two sorted files of descriptors are read in tandem, and records are compared only when their two first keys are equal. As a result, the number of pairs of descriptor records that must be compared is greatly reduced. However, unless the shifted descriptors are added to the file of including descriptors (overfile) as discussed above, many inclusions will be missed. This method yields good efficiency when inclusion checking is to be carried out for entire files using batch methods.

Figure 9:
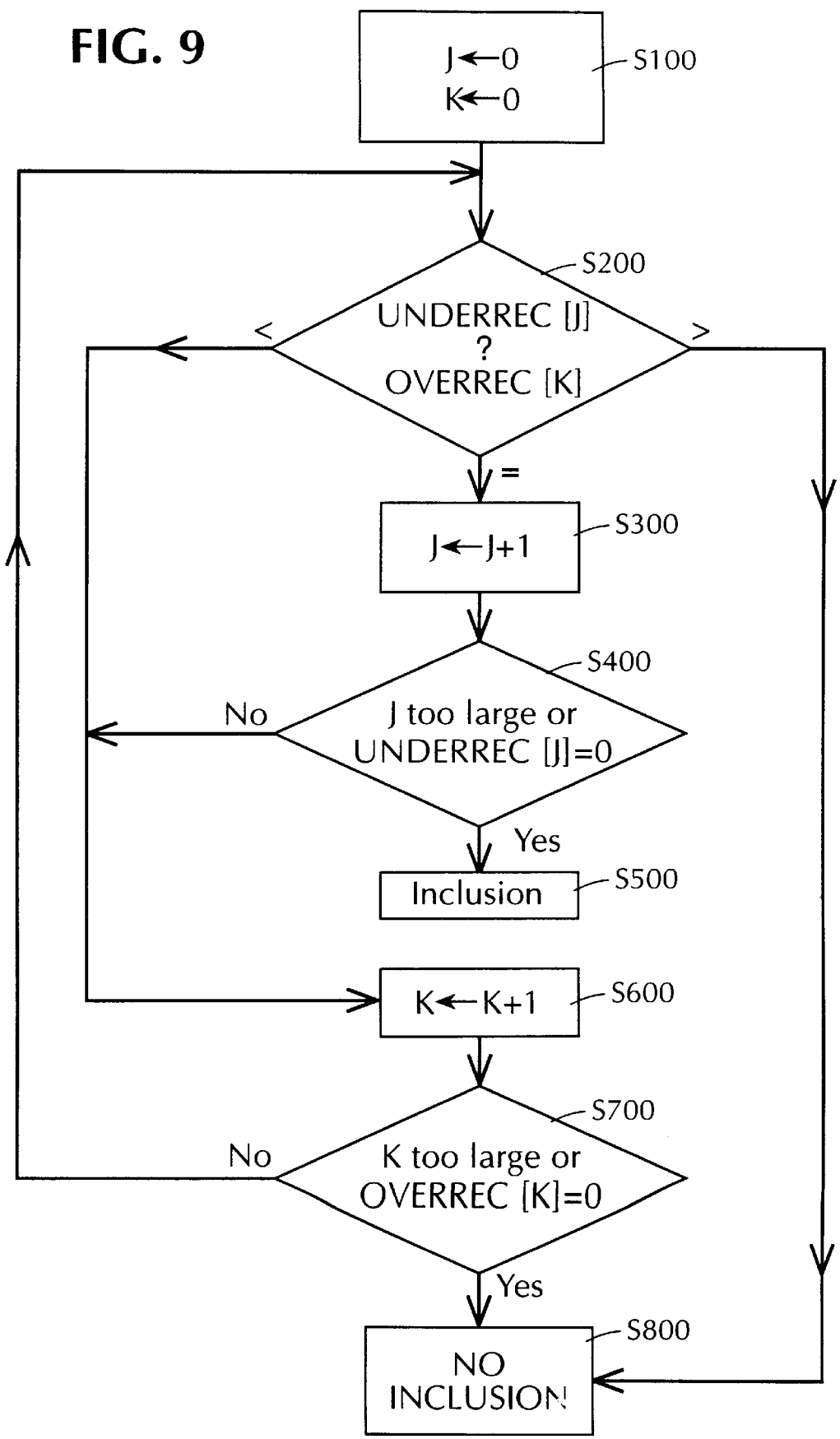
FIG. 9 is a flowchart illustrating the logical flow of the check for descriptor inclusion.

When the first of two descriptors is included in the second, the situation is as shown in FIG. 8A. In that figure, each key in the upper descriptor also appears in the lower descriptor. FIG. 9 is a flow chart showing the steps for a program that checks whether one descriptor, UNDERREC, from an underfile of descriptors, is included in another descriptor OVERREC from an overfile of descriptors. The program illustrated in FIG. 9 comprises the "have inclusion?" determination at S5 in the match program flowchart shown in FIG. 10 discussed below.

In FIG. 9, the key fields in the descriptors to be compared are indexed from zero. Index variable J is used for the UNDERREC and K is used to index the OVERREC. The "J too large" check is performed before the check for the value of UNDERREC[J].

Although a three-way diamond is used in the flowchart to reduce the number of blocks in the diagram, only a few computer languages (e.g., Fortran) actually permit a three-way test in one statement. Therefore, the process shown by the three-way diamond would normally be implemented as two two-way tests.

A description of the logic of the flowchart shown in FIG. 9 is as follows:

First, for given values of J and K, the following assumptions (a) and (b) hold (note that they hold trivially when J=K=0):

(a) For any J'<J, UNDERREC[J']=OVERREC[K'] for some K'<K (where J is the current index value of the UNDERREC and J' is some previous index value of the UNDERREC and where K is the current index value of the OVERREC and K' is some previous index value of the OVERREC).

(b) For the current J, when the top diamond S200 in FIG. 9 is entered, UNDERREC[J] is a key that has not yet been found in OVERREC. This is true because no duplicated keys are present in any descriptor.

At step S100, index variables J and K are initialized to zero. At step S200 it is determined whether the currently indexed key of the UNDERREC is less than, greater than, or equal to the currently indexed key of OVERREC. If UNDERREC[J] is greater than OVERREC[K], then there can be no inclusion. This is because, as discussed above, each and every descriptor is sorted in descending order. Therefore, if this OVERREC[K] is smaller than this UNDERREC[J], later members of OVERREC can only be smaller, and by assumption (b), UNDERREC[J] has not yet been found in OVERREC.

If UNDERREC[J] is equal to OVERREC[K], then inclusion cannot so far be ruled out and the comparisons must continue. J is incremented and a check is made at S400 to see if any keys remain in UNDERREC to be compared.

If J is too large (index out of range) or UNDERREC[J]=0, then there are no more nonzero keys in the UNDERREC to be compared and inclusion exists, otherwise, K is incremented at S600. A check is made, at S700 to determine if any more nonzero keys remaining in OVERREC. If no more keys remain in OVERREC, there is no inclusion, by assumption (b). If more keys remain in OVERREC, the flow of operation returns to step S200.

If, at S200, UNDERREC[J] is less than OVERREC[K], the program immediately proceeds to S600 to increment the index value of OVERREC.

The following observations can be made with reference to assumptions (a) and (b):

When J is found to be too large, at S400, inclusion has occurred, since UNDERREC[J'] was a key found in OVERREC for all smaller J' by (a). Otherwise, (a) and (b) continue to hold for the larger value of J, since in order to increase J at S300 it must be true that UNDERREC[J]=OVERREC[K].

When K is increased at S600, it must be true that UNDERREC[J] has not been found in OVERREC, by assumption (b). So, if the new value of K is too large, there is no inclusion. Otherwise (a) and (b) continue to hold for the larger value of K, since UNDERREC[J] is not equal to OVERREC[K] before K is incremented.

If, at S200, UNDERREC[J]>OVERREC[K], then by (b) UNDERREC[J]0 has not yet been found in OVER-REC.

This OVERREC[K] is too small to equal UNDERREC [J], and later members of OVERREC are even smaller. So there can be no inclusion.

Figure 10:
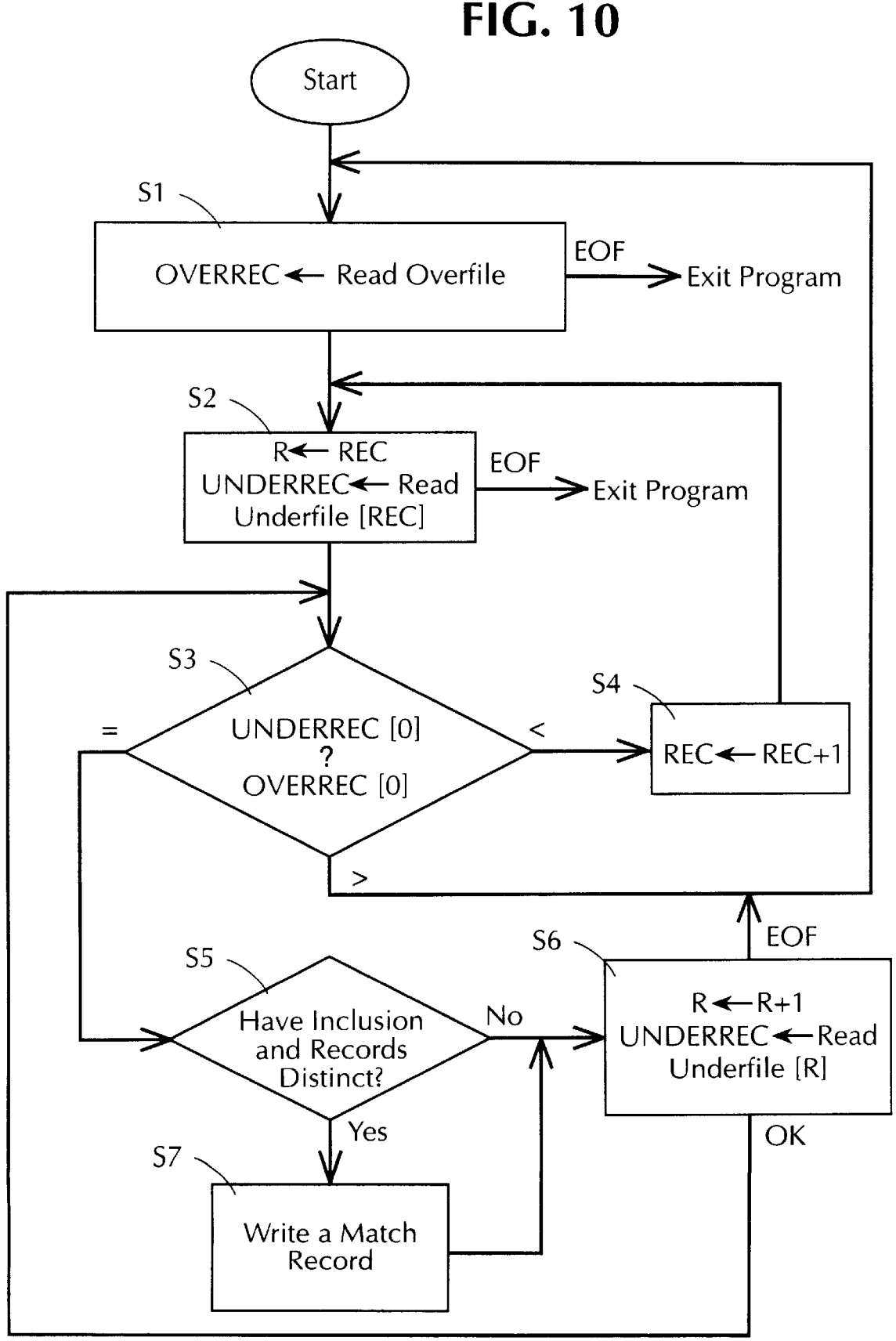
FIG. 10 is a flowchart illustrating the match program executed at the trusted third party.

The match program compares two files of descriptors, the overfile and the underfile, and finds all pairs of records (matches) such that the underfile descriptor is included in the overfile descriptor. FIG. 10 is a flow chart illustrating operation of the match program.

For a match to be declared, the name, address, and city groups must all be pairwise related by inclusion. The state and zipcode records must simply be equal, or be "close" as defined by a criterion such as those discussed above.

In general, the flowchart can be viewed as consisting of:

(a) An outer loop that performs a serial read of the overfile of including descriptors. This loop is entered at "Start". Each step of the loop begins by executing a read from the overfile into the buffer OVERREC at S1. The loop ends when an end-of-file condition is encountered during this attempted read.

(b) An inner loop in which a comparison is made of the current overfile record OVERREC and each record of the underfile that has the same first key as OVERREC. The first keys are denoted OVERREC[0] and UNDERREC[0]. The inner loop is initialized at S2, where the initial value of REC is 1, the actual key of the first record in the underfile. The loop continues through S3, where a test occurs, to S5 and S6. There is a detour through S7 when a match, or descriptor inclusion, is found. The loop then normally returns from S6 to S3, unless the underfile has reached the end-of-file. The inner loop terminates when either the "=" branch is not taken at S3, indicating that the first key of underfile record number R is different from OVERREC[0], the current first key of the overfile, or when the read at S6 reaches end-of-file.

In more detail, the inner loop index is R. R is initialized to REC at S2. REC is intended to be the actual key (record number) of the first record of the underfile that has the same first key as the current overfile record in the buffer OVER-REC.

The inner loop continues to S3, where there is a check that first keys of the two descriptors are equal. If they are not, the inner loop is terminated and one or the other file is advanced in an attempt to synchronize the ordered files. If the "<" branch is taken, then the first key of the UNDERREC buffer is smaller than the first key of the OVERREC buffer and the variable REC is incremented at S4 to advance the underfile in an attempt to catch-up with the overfile. If the ">" branch to Si is taken, the overfile is advanced in an attempt to catch up with the underfile.

If the two first keys are equal the inner loop continues to S5. Here a check for inclusion ("have inclusion") is performed. The block S5 is detailed in FIG. 9. When there is inclusion, a match record giving both sequence numbers is written at S7. However, writing of the match record is suppressed if the matching records contain the same bank and account numbers (a trivial match).

In either case, the loop continues to S6 where R is incremented and a new underfile record is read into the UNDERREC buffer. If this read succeeds, the OK branch is taken back to S3. If there is an end-of-file condition, the EOF branch is taken to S1 where the outer loop advances.

Figure 11:
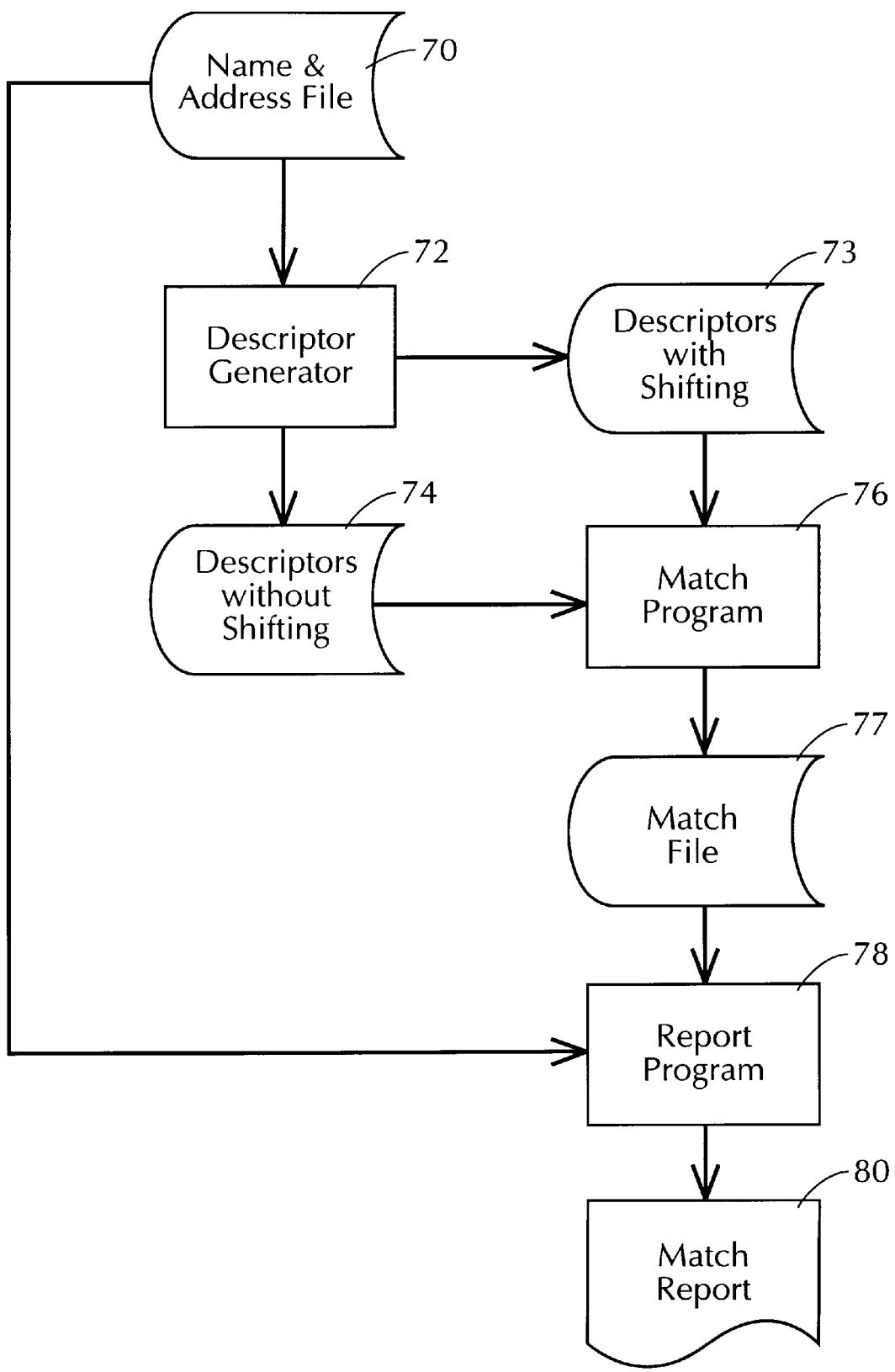
FIG. 11 is a program and data flow diagram illustrating a batch matching job at the trusted third party.

FIG. 11 is job flow for a batch matching job. A name and address file 70 contains name and address data. The descriptor generator 72 is described above; it generates the two descriptor files 73 and 74. The file containing shifted descriptors 74 is used as the file of including descriptors, i.e., the over-file. The other descriptor file 73 is used as the underfile of included descriptors in the match. Both descriptor files are in sorted order at the start. In this sort, the entire record is used as sort key, and the sort is in ascending order.

The match program 76 (described in detail in FIG. 10) finds all pairs of descriptors from the two files such that the under-descriptor record is included in the over-descriptor record. Pairs with identical under and over records are suppressed; they are the trivial inclusions of a descriptor in itself, and so are not significant. The result of the match program is used to create a match file 77. The report program 78 obtains more name and address data from file 70 and produces a match report 80.

The resulting match records need contain only sequence numbers from the two matching records.

A variation using the U.S. Government Standard Hashing Algorithm (SHA) to hash the descriptors will now be discussed. It may be considered desirable to use hashed descriptors (via SHA) to reduce the dispersal of customer information among the various banks and to reduce the size of the descriptor record. This would entail hashing the entire descriptor as a whole. However, any such use of hashing introduces some minute additional risk of misidentification, since distinct descriptors could theoretically map to the same hash value. This minute additional risk can probably be more than offset by increasing the maximum number of encoded keys in the pre-hashed descriptor, thus reducing the possibility of error due to the maximum descriptor size being exceeded. Since SHA reduces the descriptor to a fixed maximum size, this pre-hashed increase in size carries a cost only to the TTP, not to the participants.

The main disadvantage of using hashing in this manner is that the only matching criterion that can be used at the banks with a hashed descriptor is exact (all or nothing) matching. No more subtle comparisons, such as partial equality, inclusion, or distance methods, would be possible.

Distance Functions

A variation on the subset/superset problem discussed above will now be discussed. The goal is to provide a way to ensure that names of distinct UID's will not be confused.

The N/A subset relationship described in (C) above can be generalized. Consider distance functions, also called a metrics. Given two sets S and T, the set difference S−T consists of those elements of S that are not also in T. Let #(S−T) denote the number of elements in this set. Then $$\text{Define: dist}(S,T) = \#(S-T) + \#(T-S)$$

This defines a metric that measures the distance between the two sets in a particular sense. Metrics are a standard mathematical device having the following three properties:

For all sets R, S, and T,
(1) If dist (S,T)=0 then S=T,
(2) dist (S, T)=dist(T, S)
(3) dist (R, S)+dist(S,T)>=dist(R,T) [>=is read "is greater than or equal to"]

The function defined above satisfies these conditions. There are many variations on this definition that also satisfy the three conditions. For example, defining $$\text{dist2 } (S,T)=\max(\#(S-T),\#(T-S))$$

yields another function dist2 which also satisfies (1) through (3).

Even better metrics may be defined using the relative frequencies of the tokens. Rather than counting the tokens in the difference sets with "#", one adds the negative logarithms of the relative frequencies of the tokens in these difference sets. In this way rare words will contribute more to the distance than common words.

Having made such a definition, it may then be asked for any name and address entry in the database: What is the minimum distance from this entry to another entry? The greater this minimum distance, the smaller is the chance that a user error can transform one entry into the other. If necessary, in a variation of this system the techniques of (C) and (D) above could be modified to report any instances where entries closer than a given minimum distance exist in the database. Each positive result could trigger the same actions described there.

Encoder Maintenance

Encoder features are preferably fixed once and for all, as far as is possible. This is because changing the encoding table forces changes to the entire file of encoded descriptors. Thus, encoder table changes would be made only at infrequent intervals when considerable computer resources and time are available to compute new codes for all records.

The main features of the simple encoder supplied to participating banks are the ability to:
(1) supply a token with an encoded value stored in a field of fixed size within the computer,
(2) define synonyms and noise words with the same encoded value or no encoded value, respectively, and
(3) indicate the relative rarity of the more common words for use in ordering keys within a descriptor.

All of these features are embodied in the assignment of encoded values to tokens. In particular, lower encoder values usually indicate a more common token. Token number one should therefore be the most common token. However, this correspondence between encoded value and token frequency is not terribly critical. So, infrequent updates should be sufficient to ensure efficient operation.

Figure 12:
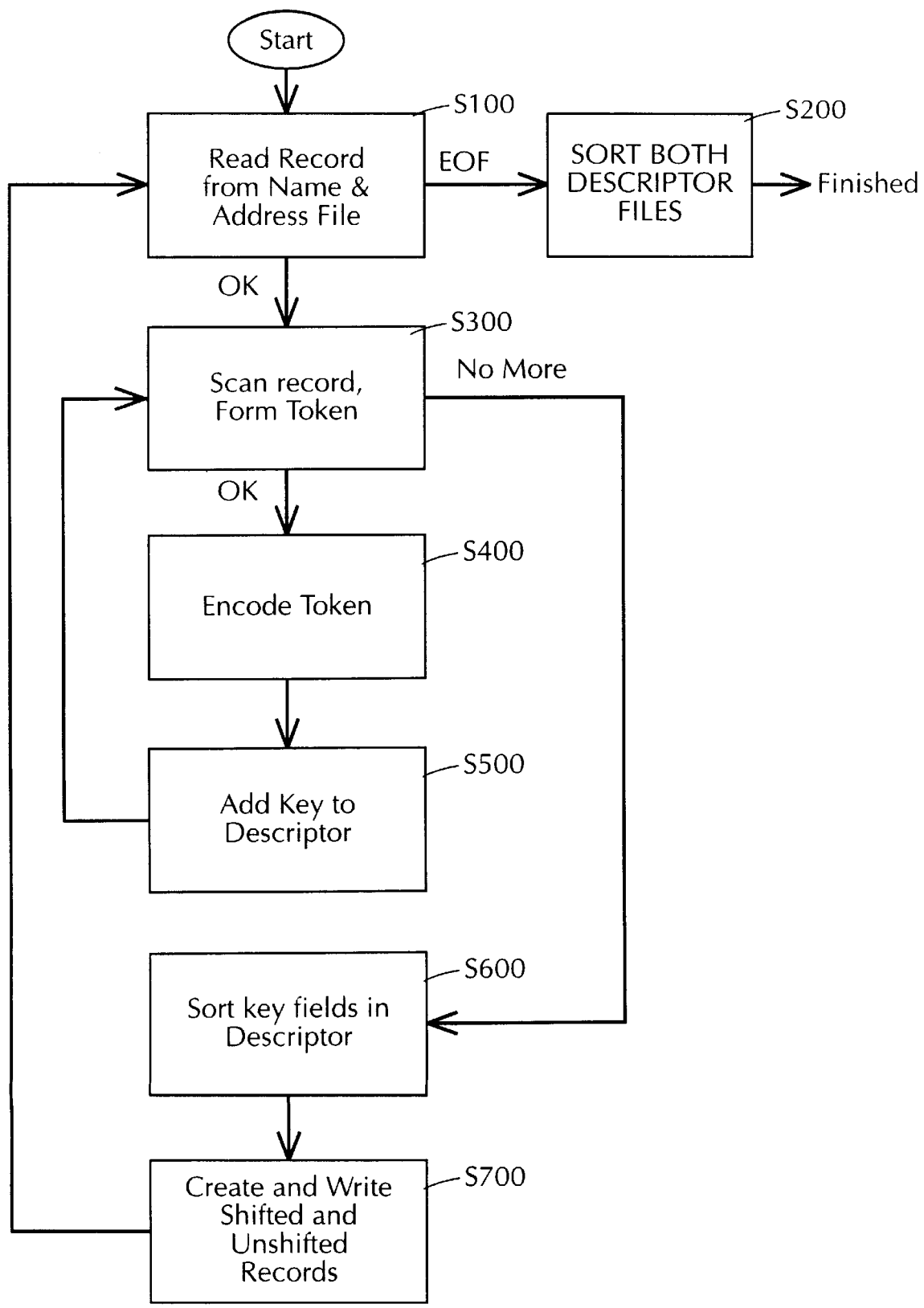
FIG. 12 is a flowchart illustrating the descriptor generator program resident at the trusted third party.

FIG. 12 is a flowchart illustrating the descriptor generator program resident at the trusted third party. At step S100 a record is read from the name and address file. Next, if not EOF, the read record is secured and a token formed at S300. At step S400 the token is encoded to form a key, and at S500, the key is added to the descriptor. Steps S300, S400 and S500 are repeated as long as there is a record to scan. If there are no more records, the flow proceeds to S600 at which the key fields in the descriptor are sorted. At S700, the shifted and unshifted records are created and written, and the flow loops back to S100. When the end of the name and address file is reached, both descriptor files are sorted.

II. Electronic Bill Presentment

In addition to facilitating payments to billers, the system of the present invention can also be used in reverse to allow billers to present bills to consumer's (potential payors). Such a system would utilize the UID database resident at the TTP to transmit an ACH message to the potential payor's home banking system.

In the bill presentment system, companies or individuals that wish to bill electronically send billing data to the TTP. The TTP uses the UID database to route these bills electronically to the home banking system to present the bills. The bills are delivered to the home banking system in ASC X12 format using the 810 or 811 transaction set.

The biller in this system delivers a file containing consumer bills in X12 format to the TTP. The TTP routes the consumer's bill in accordance with the routing information contained in the database. Optimally, this would involve routing the bill to the consumer's bank in X12 format. The consumer's bank routes the bill to its home banking system and presents it to the consumer using a proprietary (or open) interface that the bank uses to communicate with its customers.

If the consumer is willing to pay the bill, it would do so by flagging the bill for payment using the interface supplied by its bank. Since the bill was received by the bank in X12 format, it would be able to route the payment through the appropriate payment network. Accompanying the payment would be X12 remittance data created from the original X12 invoice. Assuming the ACH network is used, the payment would be carried in either a Consumer Initiated Entry (CIE) or Corporate Trade Exchange (CTX) transaction. The accompanying X12 remittance would be appended to the CTX or CIE as addenda records. The payment would pass through the ACH network and be delivered to the biller's receiving bank. The receiving bank would credit the account of the biller, and pass the X12 remittance to the company.

As an alternative electronic bill presentment method, banks that do not currently offer home banking, do not want to develop bill presentment on their home banking systems, or simply want to provide multiple access methods for their customers, can offer bill presentment through the Internet. Such a web-based bill presentment system would be customized for each participating bank. Consumers gain access to a bill presentment web site through the web site of the participating bank. Participating banks provide a link on their web page to the bill presentment web site. The bill presentment web site may be managed by each individual bank, or operated by an automated clearing house, such as NYACH.

Where the web site is managed by the automated clearing house, billers deliver information to the clearing house in the same manner as in the home banking bill presentment option discussed above. Instead of forwarding billing data to the participating bank's home banking system, data for each consumer is kept on a secure system at the clearing house. This system is connected, off-net, to the web-based bill presentment server.

To utilize the system, a consumer logs in at the bill presentment site, or alternatively, uses a secure browser and certificate issued by his or her bank. After being successfully authenticated at the bill presentment server, the consumer is shown a summary of bills available for payment. The consumer then may click on any bill he or she wishes to examine. The bill presentment server then sends an inquiry to the clearing house system. The billing information is sent back to the bill presentment server, converted to HTML, and displayed to the consumer.

The consumer can then indicate a willingness to pay the bill by clicking on a payment icon associated with the presented bill. Payment orders may be collected by the clearing house system, where they can be converted into an ACH payment in consumer initiated entry (CIE) format, or corporate trade exchange (CTX) format. These ACH payments are forwarded in batches to the consumer's bank for balance verification and origination into the ACH network.

The embodiments discussed above are illustrative and are not intended to limit the scope of the present invention to the particular method of (or system for) carrying out the invention described therein. The scope of the invention is to be interpreted broadly, in view of the appended claims.

What is claimed is:

1. A computer-readable medium for storing data for access by an application program being executed on a data processing system resident at a trusted third party that has been supplied with confidential information of customers of at least one participating institution, said medium comprising:
    a data structure stored in said computer-readable medium, said data structure including information resident in a database used by said application program and comprising:
    a plurality of descriptors, each descriptor including a set of indicia identifying name, address, and the confidential information for one of the customers of the at least one participating institution, and a universal identifier uniquely identifying the one customer.

2. A computer-readable medium according to claim 1, wherein the database of descriptors is structured so as to eliminate any descriptors whose set of indicia constitutes a subset of the set of indicia of any other descriptor, in order to ensure uniqueness of descriptors.

3. A computer-readable medium according to claim 1, wherein the database is structured to minimize the possibility that any one descriptor will be confused with any other descriptor by using distance functions to require a minimal distance between the sets of indicia included in respective descriptors.

4. A computer-readable medium according to claim 1, wherein the database is structured to minimize the possibility that similar sounding name and address information does not encode to a same descriptor by using phonetic encoding techniques in preparation of the database.

5. A computer-readable medium according to claim 1, wherein the confidential information comprises routing/transit number and account number information associated with each customer.

* * * * *

UNITED STATES PATENT AND TRADEMARK OFFICE
CERTIFICATE OF CORRECTION

PATENT NO.    : 6,317,745 B1                                          Page 1 of 1
DATED         : November 13, 2001
INVENTOR(S)   : George F. Thomas et al.

It is certified that error appears in the above-identified patent and that said Letters Patent is hereby corrected as shown below:

<u>Column 2,</u>
Line 43, "bill." should read -- bill --.

<u>Column 9,</u>
Line 2, "Nation" should read -- National --.

<u>Column 16,</u>
Line 37, "from" should be deleted; and
Line 38, "participating" should read -- from participating --.

<u>Column 19,</u>
Line 15, "UNDERREC[J]0" should read -- UNDERREC[J] --.

Signed and Sealed this

Eighth Day of July, 2003

JAMES E. ROGAN
*Director of the United States Patent and Trademark Office*